US009454392B2

(12) United States Patent
Luxenberg et al.

(10) Patent No.: US 9,454,392 B2
(45) Date of Patent: Sep. 27, 2016

(54) ROUTING DATA PACKETS BETWEEN VIRTUAL MACHINES USING SHARED MEMORY WITHOUT COPYING THE DATA PACKET

(71) Applicant: Red Hat Israel, Ltd., Raanana (IL)

(72) Inventors: Roni Luxenberg, Raanana (IL); Uri Lublin, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 376 days.

(21) Appl. No.: 13/686,576

(22) Filed: Nov. 27, 2012

(65) Prior Publication Data
US 2014/0149981 A1 May 29, 2014

(51) Int. Cl.
G06F 9/455 (2006.01)
H04L 12/861 (2013.01)
G06F 13/38 (2006.01)
G06F 9/54 (2006.01)
G06F 13/24 (2006.01)
G06F 9/50 (2006.01)

(52) U.S. Cl.
CPC ....... G06F 9/45533 (2013.01); H04L 49/9005 (2013.01); *G06F 9/45545* (2013.01); *G06F 9/45558* (2013.01); *G06F 9/5077* (2013.01); *G06F 9/544* (2013.01); *G06F 13/24* (2013.01); *G06F 13/385* (2013.01); *G06F 2009/4557* (2013.01); *G06F 2009/45579* (2013.01); *G06F 2009/45583* (2013.01); *G06F 2009/45595* (2013.01)

(58) Field of Classification Search
USPC ............. 718/1; 370/235, 392, 401; 709/226; 711/6
See application file for complete search history.

(56) References Cited

U.S. PATENT DOCUMENTS

| 7,251,815 B2* | 7/2007 | Donovan et al. ............. 718/105 |
| 7,620,955 B1* | 11/2009 | Nelson .......................... 719/312 |
| 7,937,438 B1 | 5/2011 | Miller et al. |
| 7,953,865 B1 | 5/2011 | Miller et al. |
| 2004/0267922 A1 | 12/2004 | Rover et al. |
| 2005/0114855 A1 | 5/2005 | Baumberger |
| 2007/0061492 A1* | 3/2007 | van Riel ............... G06F 9/5077 710/3 |
| 2007/0067775 A1* | 3/2007 | Shultz et al. ................. 718/102 |
| 2009/0073895 A1 | 3/2009 | Morgan et al. |
| 2009/0144510 A1* | 6/2009 | Wibling ................ G06F 9/5016 711/147 |
| 2009/0276771 A1 | 11/2009 | Nickolov et al. |

(Continued)

FOREIGN PATENT DOCUMENTS

WO WO 2011078861 6/2011

OTHER PUBLICATIONS

Burtsev et al., Fido: Fast Inter-Virtual-Machine Communication for Enterprise Appliances, 2009, USENIX'09 Proceedings of the 2009 conference on USENIX Annual technical conference, 1-14.*

(Continued)

Primary Examiner — Abu Ghaffari
(74) Attorney, Agent, or Firm — Lowenstein Sandler LLP

(57) ABSTRACT

A computing device executing a virtual machine and a hypervisor that manages the virtual machine receives a data packet that is addressed to the virtual machine. The computing device writes the data packet to a buffer in a shared memory. The computing device maps the buffer to a memory of a virtual appliance that is hosted by the hypervisor to enable the virtual appliance to operate on the data packet without making a copy of the data packet. The computing device provides the data packet to the virtual machine after the virtual appliance has operated on the data packet.

17 Claims, 13 Drawing Sheets

(56) References Cited

U.S. PATENT DOCUMENTS

| | | |
|---|---|---|
| 2010/0027552 A1 | 2/2010 | Hill |
| 2010/0199275 A1* | 8/2010 | Mudigonda et al. ............. 718/1 |
| 2010/0211947 A1* | 8/2010 | van Riel ............... G06F 9/5077 718/1 |
| 2010/0223419 A1* | 9/2010 | Cardona et al. ................. 711/6 |
| 2010/0228934 A1* | 9/2010 | Chandrasekaran et al. .. 711/162 |
| 2010/0332617 A1* | 12/2010 | Goodwin et al. ............. 709/219 |
| 2010/0333088 A1* | 12/2010 | Rogel ................ G06F 9/45533 718/1 |
| 2011/0225282 A1* | 9/2011 | Hahm ................ H04L 12/4641 709/223 |
| 2011/0243142 A1 | 10/2011 | Kwon et al. |
| 2012/0331250 A1* | 12/2012 | Nelson ............... G06F 9/45533 711/162 |
| 2013/0007239 A1 | 1/2013 | Agarwal et al. |
| 2013/0163606 A1 | 6/2013 | Bagepalli et al. |
| 2013/0174155 A1* | 7/2013 | Yang et al. ...................... 718/1 |
| 2014/0101306 A1 | 4/2014 | Murgia |
| 2014/0146705 A1 | 5/2014 | Luxenberg et al. |
| 2014/0149490 A1 | 5/2014 | Luxenberg |
| 2014/0149981 A1 | 5/2014 | Luxenberg et al. |

OTHER PUBLICATIONS

MacDonell, Cam, "Nahanni a shared memory interface for KVM," Aug. 10, 2010, 19 pages, University of Alberta, Alberta, Canada.

Barham et al., "Xen and the Art of Virtualization," Oct. 19-22, 2003, 14 pages, University of Cambridge Computer Laboratory, Cambridge, UK.

Red Hat, Inc., "Red Hat Enterprise Linux 5 Virtualization Guide," 2011, 440 pages, Edition 5.8, Red Hat, Inc. Raleigh, NC, USA.

Sean Barket et al., "An empirical Study of Memory Sharing in Virtual Machines," 2012 USENIX Annual Technical Conference, Jun. 13-15, 2012, Boston, MA.

USPTO Office Action for U.S. Appl. No. 13/686,544 Dated Sep. 10, 2014.

USPTO Office Action for U.S. Appl. No. 13/686,544 Dated Dec. 31, 2014.

USPTO Office Action for U.S. Appl. No. 13/686,561 Dated Apr. 16, 2014.

USPTO Office Action for U.S. Appl. No. 13/686,561 Dated Oct. 28, 2014.

USPTO Office Action for U.S. Appl. No. 13/686,576 Dated Jan. 14, 2015.

U.S. Appl. No. 13/686,544, filed Nov. 27, 2012, Dynamic Routing Through Virtual Appliances.

U.S. Appl. No. 13/686,561, filed Nov. 27, 2012, Managing a Dynamically Configurable Routing Scheme for Virtual Appliances.

USPTO Non-Final Office Action for U.S. Appl. No. 13/686,544 dated May 5, 2015.

USPTO Final Office Action for U.S. Appl. No. 13/686,544 dated Oct. 20, 2015.

USPTO Non-Final Office Action for U.S. Appl. No. 13/686,561 dated Aug. 10, 2015.

USPTO Notice of Allowance for U.S. Appl. No. 13/686,561 dated Feb. 8, 2016.

* cited by examiner

ROUTING DATA PACKETS BETWEEN VIRTUAL MACHINES USING SHARED MEMORY WITHOUT COPYING THE DATA PACKET

TECHNICAL FIELD

Embodiments of the present invention relate to virtual machines, and more specifically to managing the routing of data through virtual appliances.

BACKGROUND

Traditional network appliances are hardware computing devices that are configured to perform a specific task or tasks on data packets that they receive. These network devices may be configured to intercept messages sent between two computing devices, and to operate on those messages before sending them on. Examples of such network appliances include a firewall, a wide area network (WAN) optimizer, and so forth.

A single network may use multiple network appliances. To enable such operation of multiple network appliances, these network appliances are traditionally arranged in a chain, in which a first network appliance is configured to send messages to a second network appliance after operating on the messages, the second network appliance is configured to send the messages to a third network appliance after operating on the messages and so on. To modify such a chain of network appliances, an administrator traditionally manually reconfigures one or more of the network appliances in the chain.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Figure 1:
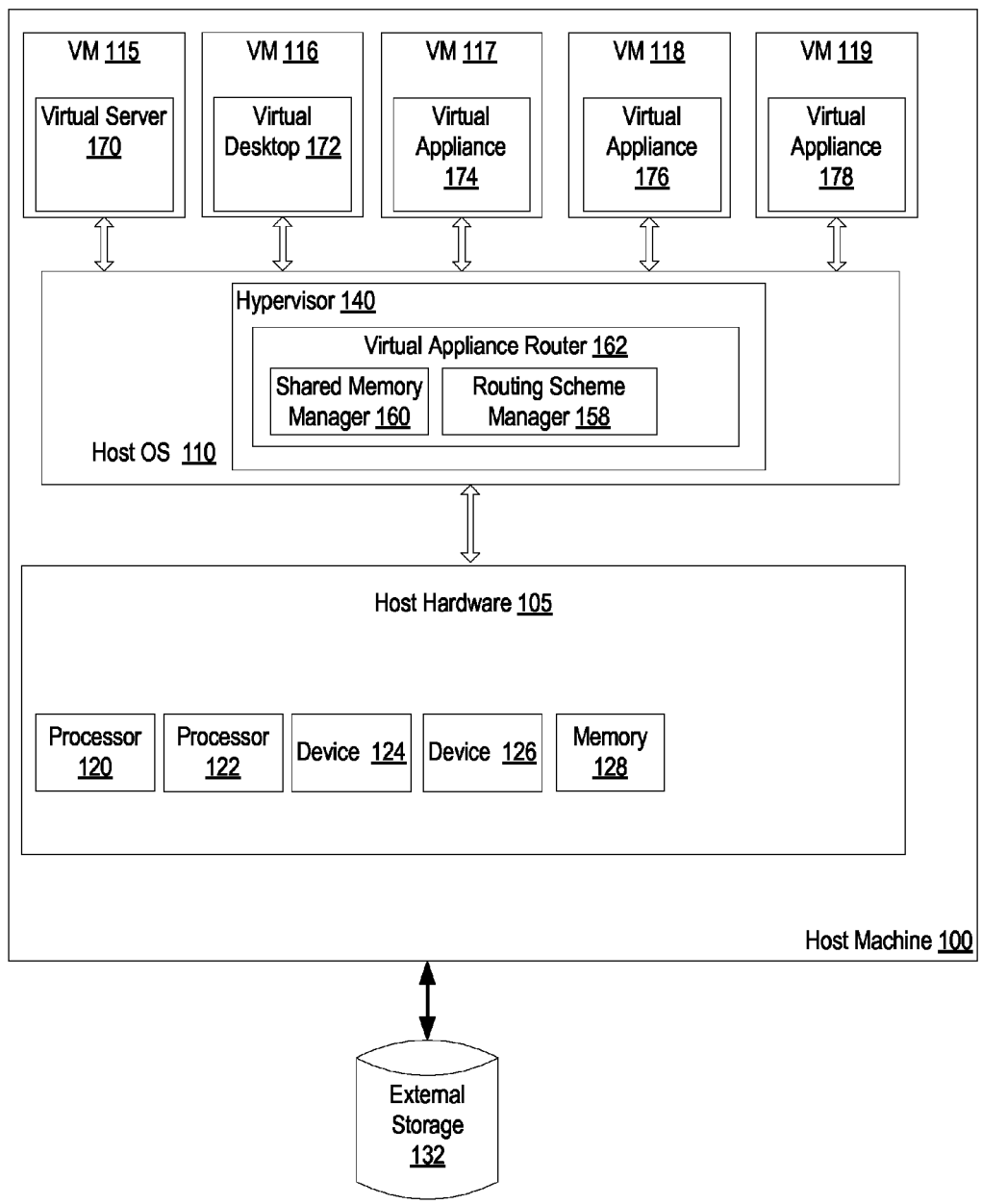
FIG. 1 is a block diagram that illustrates an embodiment of a computer system that hosts one or more virtual machines and virtual appliances.

Described herein is a method and system for routing data packets (e.g., messages) between a virtual server (or virtual desktop) and a client of the virtual server (or virtual desktop) through one or more virtual appliances. A hypervisor may manage both virtual machines including virtual servers and/or virtual desktops and virtual machines including virtual appliances that provide the functionality traditionally provided by hardware network appliances. The hypervisor may monitor conditions associated with the client such as the client's available network bandwidth, latency, round trip time for messages between the client and the virtual machine, client geographical location, client's network address, and so on. The hypervisor may additionally monitor conditions associated with the virtual server such as a load on the virtual server, resources available to the virtual server, security alert status for the virtual server, security settings for the virtual server, and so forth.

Based on the conditions associated with the client and/or virtual server, the hypervisor may determine whether or not to route data packets from the client through any particular virtual appliance. As the conditions change, the hypervisor may reassess whether to route data packets through that virtual appliance. Such routing of data packets through the virtual appliance, as well as a change in such routing, may be performed transparently to the client and to the virtual server (e.g., without any indication to the client or the virtual server that such routing is or is not taking place). Moreover, the routing may be performed transparently to the virtual appliances (e.g., such that a virtual appliance does not know of other virtual appliances that messages are routed to).

The hypervisor may route data packets through a sequence of multiple different virtual appliances, some or all of which may be managed by the hypervisor. The hypervisor may change the order of the sequence of virtual appliances, add new virtual appliances to the sequence and/or remove virtual appliances from the sequence at any time. Such changes may be made without notifying or reconfiguring any of the virtual appliances, the virtual server or the client. In one embodiment, the hypervisor maintains a routing data structure (e.g., a routing graph, routing chain and/or routing table) that identifies the sequence in which data packets are routed through the virtual appliances, referred to as a routing scheme. The hypervisor may modify the sequence by adding, removing or rearranging nodes in the routing data structure. Thus, the hypervisor may periodically or continuously modify a routing scheme without any interruption in communications between the client and the virtual server.

In one embodiment, the hypervisor routes data packets between virtual appliances using a shared memory. When a data packet is received from a client, the hypervisor may write the data packet to a buffer in a shared memory managed by or associated with the hypervisor. The hypervisor may then map that buffer to a memory space of a virtual appliance. From the virtual appliance's perspective, it may appear that the virtual appliance is receiving the data packet via a standard network interface (e.g., via TCP/IP or UDP). The virtual appliance may signal the hypervisor when it has completed operating on the data packet. The hypervisor may then map the buffer to a memory space of another virtual machine, or may send the data packet to the virtual server. Use of the shared memory for routing data packets through virtual appliances may reduce an amount of utilized resources, and may speed up the transmission of the data packets between virtual appliances.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

FIG. 1 is a block diagram that illustrates an embodiment of a computer system (referred to herein as a host machine 100) that hosts one or more virtual machines (VMs) 115-119. The host machine 100 may be a rackmount server, a workstation, a desktop computer, a notebook computer, a tablet computer, a mobile phone, a palm-sized computing device, a personal digital assistant (PDA), etc. The host machine 100 includes host hardware 105, which may include multiple processors 120, 122, multiple devices 124, 126, memory 128, and other hardware components. The memory 128 may include volatile memory devices (e.g., random access memory (RAM)), non-volatile memory devices (e.g., flash memory), and/or other types of memory devices. The host hardware 105 may also be coupled to external storage 132 via a direct connection or a local network. The host machine 100 may be a single machine or multiple host machines arranged in a cluster.

Each of the devices 124, 126 may be a physical device that is internal or external to the host machine 100. Examples of internal devices include a graphics card, hardware RAID controller, network controller, secondary storage (e.g., hard disk drive, magnetic or optical storage based disks, tapes or hard drives), universal serial bus (USB) devices, internal input/output (I/O) devices, etc. Examples of external devices include a keyboard, mouse, speaker, external hard drive (e.g., external storage 132), external I/O devices, etc.

The host machine 100 includes a hypervisor 140 (also known as a virtual machine monitor (VMM)). In one embodiment (as shown) hypervisor 140 is a component of a host operating system (OS) 110. Alternatively, the hypervisor 140 may run on top of a host OS 110, or may run directly on host hardware 105 without the use of a host OS 110.

The hypervisor 140 may manage system resources, including access to memory 128, devices 124, 126, secondary storage, and so on. Alternatively, hypervisor 140 may rely on the host OS 110 to manage the system resources. The hypervisor 140, though typically implemented in software, may emulate and export a bare machine interface (host hardware 105) to higher level software. Such higher level software may comprise a standard or real-time operating system (OS), may be a highly stripped down operating environment with limited operating system functionality, may not include traditional OS facilities, etc. The hypervisor 140 presents to other software (i.e., "guest" software) the abstraction of one or more virtual machines (VMs) 115-119, which may provide the same or different abstractions to various guest software (e.g., guest operating system, guest applications, etc.).

The host machine 100 hosts any number of virtual machines (VM) 115-119 (e.g., a single VM, one hundred VMs, etc.). A virtual machine 115-119 is a combination of guest software that uses an underlying emulation of host machine 100 (e.g., as provided by hypervisor 140). Each VM 115-119 may include one or multiple virtual components such as virtual processors, virtual memory, virtual devices (e.g., virtual storage), and so forth. Each of these virtual components may map to a hardware component, such as a processor 120, 122, device 124, 126, external storage 132, or memory 128. Virtual machines 115-119 can be, for example, hardware emulation, full virtualization, para-virtualization, and operating system-level virtualization virtual machines. The guest software that runs in a VM 115-119 may include a guest operating system, guest applications, guest device drivers, etc. The virtual machines 115 may have the same or different guest operating systems, such as Windows®, Linux®, Solaris®, etc.

Some virtual machines 115-116 may include guest software that is accessible by clients (e.g., local clients and/or remote clients) to provide services to those clients. For example, VM 115 includes a virtual server 170 such as a virtual web server, a virtual data storage server, a virtual gaming server, a virtual enterprise application server, etc. A client may connect to the virtual sever 170 to request one or more services provided by the virtual server 170.

Similarly, VM 116 includes a virtual desktop 172. A virtual desktop 172 is a virtualized desktop computer, and thus may include storage, an operating system, applications installed on the operating system (e.g., word processing applications, spreadsheet applications, email applications, etc), and so on. However, rather than these functions being provided and performed at a client, they are instead provided and performed by a virtual machine 116. A virtual desktop can represent an output (e.g., an image to be displayed) generated by a desktop application running within a virtual machine. Graphics data associated with the virtual desktop can be captured and transmitted to a client, where the virtual desktop may be rendered by a rendering agent and presented by a client application.

Some virtual machines 117-119 may include guest software that performs one or more functions transparently to a virtual server, virtual desktop and/or client. For example, virtual machines 117-119 each include a virtual appliance 174-178. A virtual appliance 174-178 may be a virtual machine image file that includes a preconfigured operating system environment and a single application. The virtual appliance 174-178 may simplify the delivery, setup and operation of that single application. The virtual appliance 174-178 may be a subset of a virtual machine 117-119. Virtual appliances 174-178 may be used for deploying network applications, such as firewalls, virtual private networks, wide area network (WAN) optimizers, and so forth.

A virtual appliance 174-178 may be set up to operate on data packets (e.g., messages) sent between a client and a virtual desktop 172 or virtual server 170. The virtual appliances 174-178 may be configured to provide a specific set of services that are traditionally provided by hardware network appliances. Examples of virtual appliances 174-178 that may be used to perform the functionality of hardware network appliances include virtual firewalls, virtual wide area network (WAN) optimizers, virtual load balancers, virtual intrusion detectors, virtual intrusion preventers, virtual private network (VPN) virtual appliances, virtual routers, and so forth. Virtual appliances 174-178 may be developed by third parties, and may be configured to plug in to a virtualization environment provided by the hypervisor 140. Virtual appliances 174-178 may eliminate or mitigate the installation, configuration, and maintenance costs associated with running complex stacks of software, and may replace hardware network appliances.

In one embodiment, the hypervisor 140 includes a virtual appliance router 162. Alternatively, virtual appliance router 162 may be a separate software module that runs on the host OS 110 and communicates with the hypervisor 140. Additionally, virtual appliance router 162 may be subdivided into components, in which some components are included in hypervisor 140 and other components are external to hypervisor 140. The virtual appliance router 162 may be a component of the hypervisor 140 that determines virtual appliances 118 to route data packets through. In one embodiment, the virtual appliance router 162 includes a routing scheme manager 158 that determines routing schemes that are applicable to data packets, and that generates and maintains routing data structures that define such routing schemes. The routing scheme manager 158 may generate and maintain routing graphs that define multiple different routing schemes. The routing scheme manager 158 may additionally or alternatively generate and maintain routing chains, each of which defines a single routing scheme. Additionally, routing scheme manager 158 may generate one or multiple routing tables. A routing table may reflect a routing graph (and thus include routing information for multiple routing schemes) or a routing chain (and thus include routing information for a single routing scheme).

Virtual appliance router 162 may assign a particular routing scheme to a connection between a client and a virtual server 170 or virtual desktop 172. This may include associating the connection to a particular routing data structure. Any messages sent from the client to the virtual server or virtual desktop may be received by the host machine 100 and then routed through one or a sequence of virtual appliances in accordance with the routing scheme. Additionally, messages from the virtual server or virtual desktop to the client may also be routed through the sequence of virtual appliances (or a subset of the sequence of virtual appliances) in accordance with the routing scheme.

In one embodiment, virtual appliance router 162 includes a memory manager 160 that performs the routing of messages to virtual appliances. Each virtual appliance may include its own virtual memory, which may map to a portion of memory 128. The memory manager 160 may generate a shared memory, and may write a data packet (e.g., message) to a buffer of the shared memory. Memory manager 160 may then map the buffer in the shared memory to a virtual memory of a virtual appliance to virtually transmit the data packet stored in that buffer to the virtual appliance using zero-copy techniques. Additionally, memory manager 160 may signal a driver of the virtual appliance to indicate that a new data packet is available. The driver may then signal the memory manager 160 when the virtual appliance has finished operating on the data packet. The driver may be a component of the virtual appliance 174-178 or of the VM 117-119 that includes the virtual appliance. The memory manager 160 may then map the buffer to the virtual memory of another virtual appliance, or may provide the data packet in the buffer to the virtual server or virtual desktop. The virtual appliance router 162 is described in greater detail below with reference to FIGS. 2-5.

Figure 2:
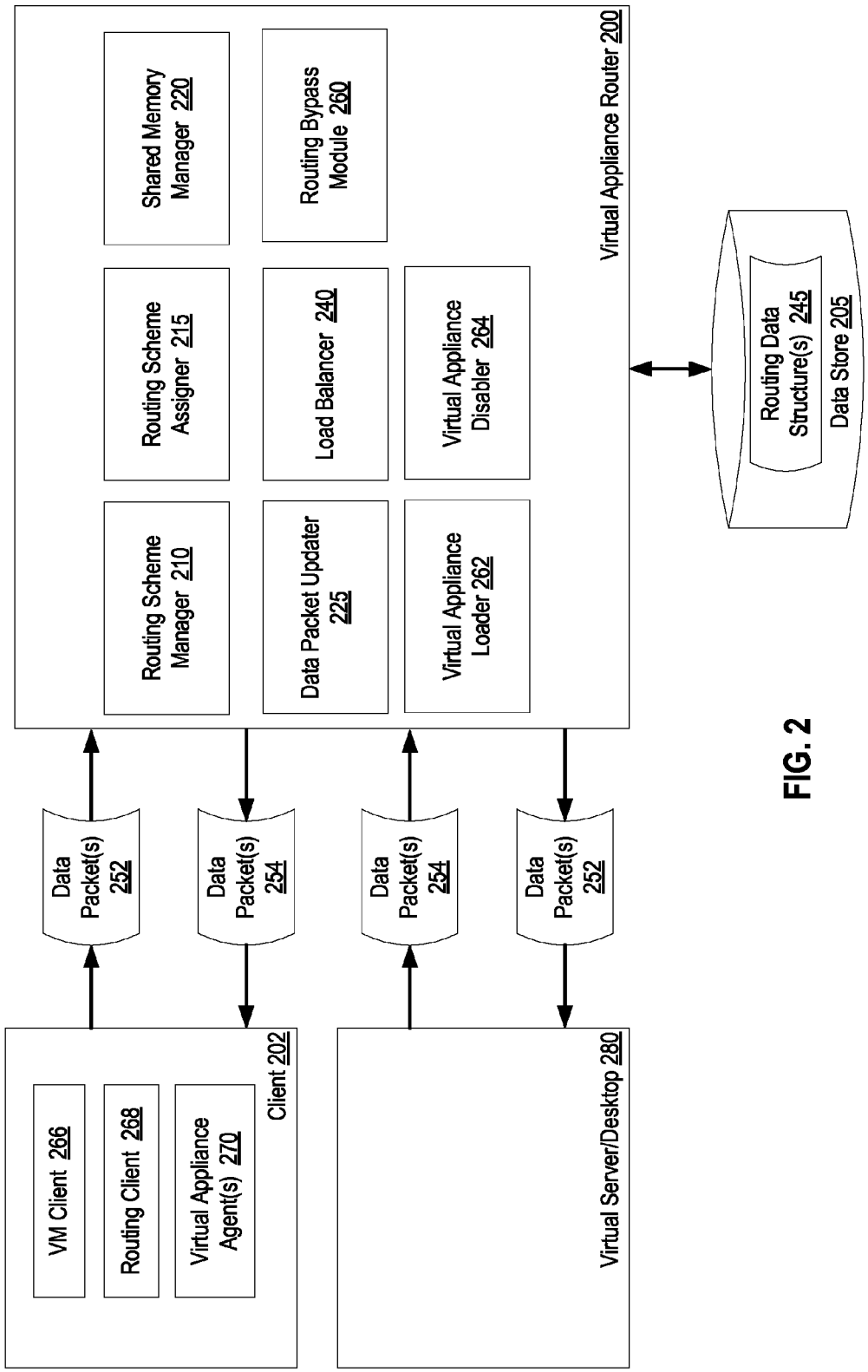
FIG. 2 is a block diagram of a virtual appliance router, in accordance with one embodiment of the present invention.

FIG. 2 is a block diagram of a virtual appliance router 200, in accordance with one embodiment of present invention. In one embodiment, virtual appliance router 200 corresponds to virtual appliance router 162 of FIG. 1. Virtual appliance router 200 is configured to receive data packets 252, 254 that are addressed to some destination, and to route data packets 252, 254 through one or multiple virtual appliances before sending those data packets 252, 254 to their intended destination. The data packets 252 may be messages from a client 202 to a virtual server 280 or a virtual desktop. Additionally, the data packets 254 may be messages such as response packets from a virtual server 280 or virtual desktop to a client 202. The client 202 may be a local client connected to a host machine that hosts the virtual desktop or virtual server. Alternatively, the client 202 may be a remote client that is networked to the host machine. In one embodiment, the client 202 is connected to the virtual server 280 or virtual desktop using a remote interface communication protocol such as remote desktop protocol (RDP®) or simple protocol for independent computing environments (SPICED).

In one embodiment, the virtual appliance router 200 includes a routing scheme manager 210, a routing scheme assigner 215, a shared memory manager 220, a data packet updater 225 and a load balancer 240. The routing scheme manager 210 and the shared memory manager 220 may correspond to routing scheme manager 158 and shared memory manager 160 of FIG. 1, respectively. Virtual appliance router 200 may additionally include a routing bypass module 260, a virtual appliance loader 262 and/or a virtual appliance disabler 264. In alternative embodiments, one or more of the routing scheme manager 210, routing scheme assigner 215, shared memory manager 220, data packet updater 225, load balancer 240, routing bypass module 260, virtual appliance loads 262 and/or virtual appliance disabler 264 may be combined into a single module or divided into multiple modules. Additionally, one or more of these modules may be an independent module that is distinct from the virtual appliance router 200.

Routing scheme manager 210 generates and maintains routing schemes. The routing schemes may be based on one or more routing policies, network conditions, conditions associated with clients, conditions associated with virtual machines that include virtual servers and/or virtual desktops, and other criteria. In one embodiment, routing scheme manager 210 generates routing data structures 245 that define the routing schemes. Routing scheme manager 210 may store these routing data structures 245 in a data store 205, which may be a non-volatile storage such as a hard disk drive or a volatile storage such as a random access memory (RAM). The routing scheme manager 210 is discussed in greater detail with reference to FIG. 3.

Routing scheme assigner 215 determines an appropriate routing scheme for incoming data packets 252, 254. A client, virtual server and/or virtual desktop may be associated with a particular routing scheme or collection of routing schemes. Routing scheme assigner 215 may determine a particular routing scheme to assign to a connection between a client and a virtual server or virtual desktop based on the associated routing schemes and/or based on current conditions of the client and/or virtual server/desktop. Assigning a routing scheme to a data packet may include associating a routing identifier to the data packet. Additionally, the routing scheme assigner 215 may associate an appliance identifier and/or node identifier to the data packet. The routing identifier may identify a routing data structure 245 that defines a routing scheme that has been assigned to the connection between the client and the server/desktop. The node identifier may identify a next node in the routing data structure that is to operate on the data packet. For example, a node identifier of 1 may indicate that the data packet should be sent to a first virtual appliance in the routing data structure, a node identifier of 2 may indicate that the data packet should be sent to a second virtual appliance in the routing data structure 245, and so on. Note that the node identifier may alternatively identify a last node that worked on a data packet. In such an embodiment, a node identifier of 0 may indicate that the first virtual appliance in the routing data structure should operate on the data packet. The appliance identifier may identify a specific virtual appliance that the data packet should be routed to.

In one embodiment, the routing scheme assigner 215 adds the routing identifier and the node identifier to a header of the data packet. Virtual appliance router 200 may then read the header to determine that the data packet should be forwarded to, for example, a first virtual appliance in a particular routing data structure. Virtual appliance router 200 may additionally assign an appliance ID corresponding to the determined first virtual appliance to the data packet.

After the virtual appliance router 200 receives the data packet back from a virtual appliance, data packet updater 225 may update the header of the data packet by incrementing or otherwise modifying the node identifier associated with the data packet. For example, if a first virtual appliance just completed work on the data packet, then the data packet updater 225 may increment the node identifier from a 1 to a 2 to indicate that the second virtual appliance in the routing data structure should operate on the data packet next. The data packet updater 225 may additionally determine a virtual appliance associated with a current routing ID and node ID for the data packet, and then associate the appliance ID for that virtual appliance to the data packet. Moreover, if at any time routing scheme assigner 215 determines that a new or different routing scheme should be associated with a connection between a client 202 and a virtual server 280, data packet updater 225 may update the routing ID associated with a data packet 252, 254. In some instances, this may cause a node ID associated with the data packet 252, 254 to be reset to a particular node ID (e.g., node ID 1 or 0).

Note that rather than the data packet updater 225 updating the node identifier, a virtual appliance that works on the data packet may update the node identifier. For example, virtual appliances may include drivers that update the node identifier when the virtual appliances are done working on the data packet. The driver may additionally signal the virtual appliance router 200 when the virtual appliances are done working on the data packet. Virtual appliance router 200 may then send the data packet to a next virtual appliance indicated by the routing identifier and updated appliance identifier associated with the data packet.

Shared memory manager 220 may send data packets to virtual appliances via a shared memory mechanism, in accordance with one embodiment of the present invention. Shared memory manager 220 may manage an area of shared memory, which may be mapped to the virtual machines of one or multiple virtual appliances. In one embodiment, shared memory manager 220 maps buffers in the shared memory to the memory space of a virtual appliance. This may make the data packet stored in that buffer available to the virtual appliance via a zero-copy technique. Zero-copy techniques include operations such as memory operations that can transfer data between processes without copying data from one memory area to another. This can minimize the use of system resources such as processor and memory.

Shared memory manager 220 can determine which virtual appliance's memory to map the data packet to based on the routing ID, node ID and/or appliance ID associated with the data packet. The shared memory manager 220 is described in greater detail below with reference to FIG. 5.

Referring back to FIG. 2, in one embodiment, virtual appliance router 200 includes a load balancer 240. Load balancer 240 may balance a load between multiple different instances of a virtual appliance. For example, two different instances of a virtual appliance may be running in parallel. Each instance of the virtual appliance may be able to handle a particular load. Both instances of the virtual appliance may be associated with the same appliance identifier in a routing data structure. When virtual appliance router 200 is to send a data packet to that virtual appliance associated with the particular appliance ID and/or node ID, load balancer 240 may determine which instance of the virtual appliance to send the data packet to (e.g., based on a current load on each instance). In response, shared memory manager 220 may map a buffer storing the data packet to the memory space of the appropriate instance of the virtual appliance.

In an alternative embodiment, load balancer 240 may load balance between multiple instances of a routing scheme. A dedicated instance of a virtual appliance may be instantiated for each node in a routing data structure. These dedicated instances of the virtual appliances may be logically connected, so that after a particular instance of a first virtual appliance operates on the data packet, then a particular instance of a next virtual appliance will operate on the data packet. Thus, each instance of a virtual appliance may be associated with a single routing scheme. For example, if two different routing schemes include the same virtual appliance, a separate instance of that virtual appliance would be instantiated for each routing scheme. The first routing scheme would forward data packets to the first instance of the virtual appliance, and the second routing scheme would route data packets to the second instance of the virtual appliance. The same principal may apply to two different instances of a particular routing scheme (e.g., so that a first instance of the routing scheme would route data packets to a first instance of a virtual appliance and a second instance of the routing scheme would route data packets to a second instance of the virtual appliance).

In such an embodiment, if the load associated with a routing data structure is high, then a new chain of virtual appliances may be generated. The new chain of virtual appliances may be the same as a previously generated chain, but may be associated with a different set of instances of those same virtual appliances in the first chain. As a new data packet is received, load balancer 240 may determine which chain of virtual appliances associated with a particular routing data structure should be used to process the data packet.

For some types of virtual appliances, the client 202 performs some operations that enable the virtual appliance to operate on data packets. For example, a virtual WAN optimizer may compress data packets 254 that are sent to the client 202 and decompress data packets 252 that are received from the client 202. This means that the client 202 would perform the corollary of compressing data packets 252 that it sends to the server (which are routed through the WAN optimizer) and decompressing the data packets 254 that are received from the server (which are also routed through the WAN optimizer). Similarly, a virtual security appliance may encrypt and decrypt messages. Accordingly, the client may perform the corollary decompressing and compressing of the messages.

In one embodiment, the client 202 includes a routing client 268. The virtual appliance router 200 may assign a routing scheme to client 202, where the routing scheme includes a virtual appliance that will benefit from client side operations on the data packets. In such an instance, the virtual appliance router 200 may send a signal to the routing client 268 indicating the virtual appliance. The routing client 268 may then initiate a virtual appliance agent 270 associated with that virtual appliance. For example, if messages will be routed through a virtual WAN optimizer, then virtual appliance router 200 may send the client 202 a signal indicating this fact. The routing client 268 may then load a WAN optimization agent, which may negotiate with the virtual WAN optimizer via the virtual appliance router 200 to establish a set of WAN optimization techniques that will be used. For example, the WAN optimizer and WAN optimization agent may agree on a particular compression algorithm to use. Thereafter, when the virtual machine client 266 generates a new data packet, that data packet is sent through the WAN optimization agent before being sent to the virtual server. Similarly, the WAN optimization agent would receive and operate on incoming messages from the virtual appliance router 200 before sending them to a virtual machine client 266 (e.g., a client application that is configured to communicate with a virtual machine) or other application running on the client 202.

Some virtual appliances may operate on data packets if a client associated with the data packets has performed a login operation or other type of authentication. In such instances, the routing client 268 may automatically provide credentials to the virtual appliance. Alternatively, the routing client 268 may prompt a user of the client device to input a username and/or password. This information may then be provided to the virtual appliance to authenticate the client 202 to the virtual appliance, and thus to enable the virtual appliance to begin performing operations on data packets from the client.

Note that in some embodiments, the routing client 268 may initiate changes in a routing policy. For example, the routing client 268 may determine that a data packet should not be routed through a particular virtual appliance, and may send an instruction to virtual appliance router 200 instructing it not to route the data packet through the virtual appliance.

In one embodiment, virtual appliance router 200 includes a routing bypass module 260. Routing bypass module 260 may determine, based on one or more conditions associated with a client and/or virtual server (or virtual desktop), whether to bypass one or more virtual appliances indicated in a routing scheme. For example, a routing scheme may specify that data packets are to be routed through a virtual backup appliance. However, if a current load on the host is high, then routing bypass module 260 may determine that data packets will not be routed through the virtual backup appliance until the load decreases. The virtual backup appliance may then be powered down to free up system resources. Additionally, a routing scheme may indicate that messages are to be sent through a virtual WAN optimizer and through a virtual firewall. However, routing bypass module 260 may determine not to route data packets from a client through the WAN optimizer if the client has high bandwidth and/or low latency. Similarly, routing bypass module 260 may determine not to route data packets from the client through the firewall if the client is on a same subnet as the virtual server or virtual desktop that it is communicating with. In another embodiment, routing bypass module 260 may determine not to route a data packet through a load balancer if a load on a virtual server that the data packet is directed to is low (e.g., below a threshold).

Figure 3:
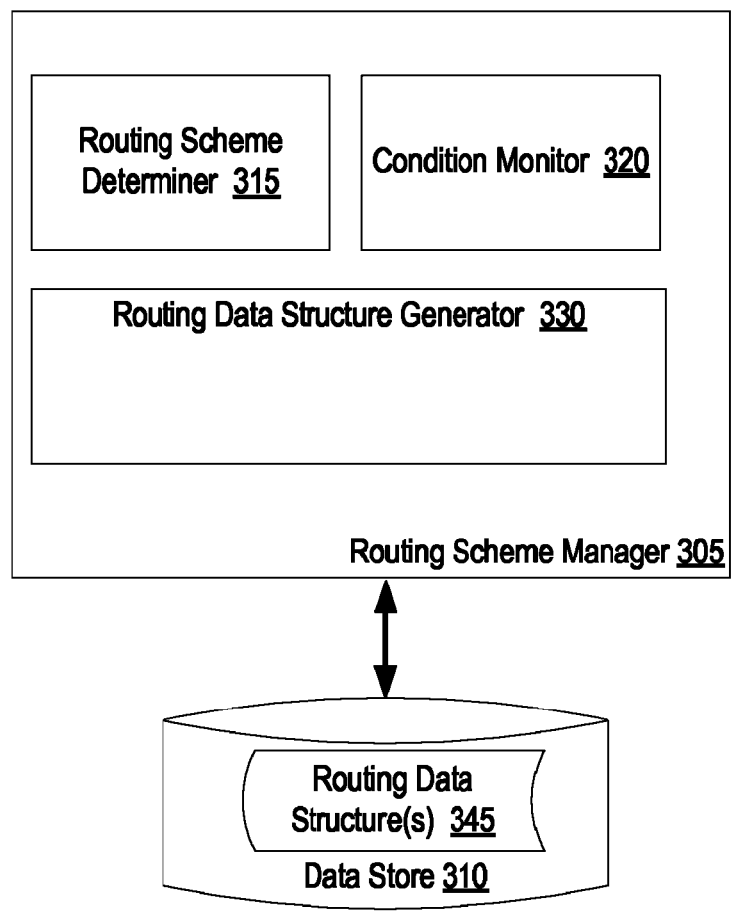
FIG. 3 is a block diagram of a routing scheme manager, in accordance with one embodiment of the present invention.
Figure 4:
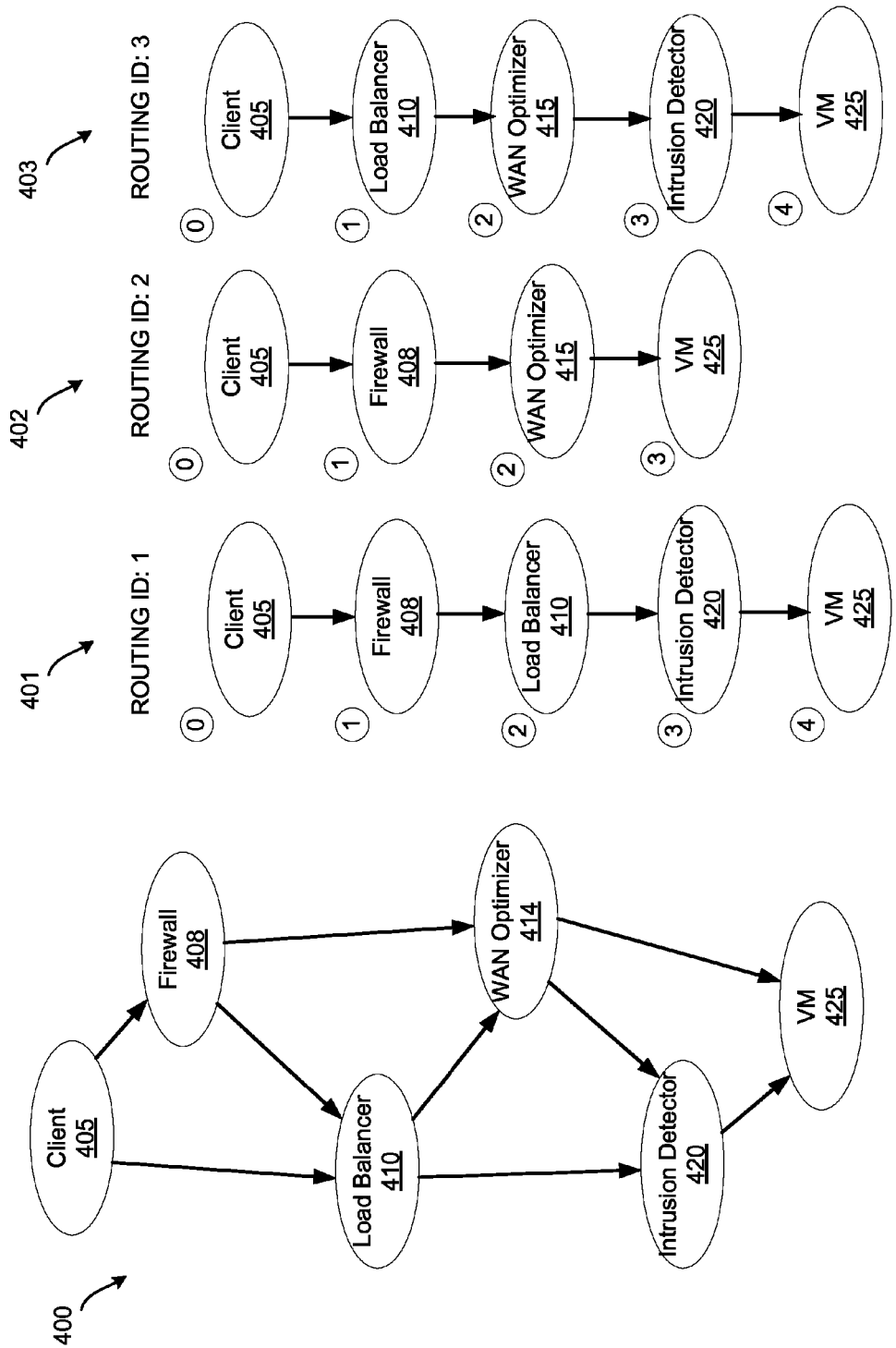
FIG. 4A is a routing graph illustrating multiple different routing schemes, in accordance with one embodiment of the present invention.
FIG. 4B illustrates a routing scheme, in accordance with one embodiment of the present invention.
FIG. 4C illustrates another routing scheme, in accordance with one embodiment of the present invention.
FIG. 4D illustrates another routing scheme, in accordance with one embodiment of the present invention.

FIG. 3 is a block diagram of a routing scheme manager 305, in accordance with one embodiment of present invention. Routing scheme manager 305 may correspond to routing scheme manager 210 of FIG. 2. In one embodiment, routing scheme manager 305 includes a routing scheme determiner 315, a condition monitor 320 and a routing data structure generator 330. In alternative embodiments, the functionality of one or more of these modules may be combined into a single module or may be subdivided into multiple modules.

Condition monitor 320 monitors conditions of clients, of virtual machines (e.g., virtual machines that include virtual servers and/or virtual desktops), of a network, and so forth. Examples of monitored conditions include network conditions such as bandwidth between a client and a VM for a virtual server or virtual desktop, a latency, a round trip time, a packet loss rate, etc. Other examples of monitored conditions include a load on a host machine, a load on particular virtual machines running on the host, time of day, and so forth. Additional conditions include a location of the client, a subnet on which the client is located, an IP address of the client, etc. Condition monitor 320 may report the monitored conditions to routing scheme determiner 315.

Routing scheme determiner 315 may include one or more rules for setting up routing schemes. A routing scheme may indicate one or more virtual appliances to route data packets through as well as a particular order or sequence in which to route the data packets through the virtual appliances. In one embodiment, routing rules are included in a routing policy, which may be defined by an administrator. The routing policy may indicate a preferred sequence of routing. For example, the routing policy may indicate that if two particular virtual appliances are used, then a data packet should be sent through a first one of the two particular virtual appliances before being sent through a second one of the two particular virtual appliances. The routing policy may indicate, for example, that data packets should be routed through a virtual firewall before being routed through any other virtual appliances.

The routing rules may specify conditions under which data packets should be sent to particular virtual machines. Routing rules may be based on a location of a client, a type of virtual server or virtual desktop that the client is being connected to, network properties, dynamic events that may occur at the server side, and so on. Some routing rules may be static rules that are set by an administrator. Other routing rules may include thresholds that indicate under what conditions data packets should be routed to particular virtual machines. For example, routing rules may include threshold bandwidths, threshold round trip times (RTT), threshold latency, threshold load, and so forth. Some routing rules may just be associated with a particular virtual server (or virtual desktop). Other routing rules may be associated with multiple or all virtual servers and/or virtual desktops.

One example routing rule specifies when to route data packets through a virtual firewall. The routing rule may specify that all data packets that are received from clients should be routed through a virtual firewall if the client is not on a subnet of the virtual server or virtual desktop that the client is connected to. Condition monitor 320 may determine an internet protocol (IP) address of the client, and from the IP address may determine a subnet on which the client is located.

Routing scheme determiner 315 may compare the subnet of the client to a subnet of the virtual server or virtual desktop. If the client is on an internal subnet of an entity (e.g., an internal corporate subnet), then the client is likely connected to a local area network (LAN) that includes the virtual server or virtual desktop. However, if the client is on an external subnet, then the client is likely connected to the virtual server or virtual desktop via a wide area network (WAN) or a public network such as the internet. Accordingly, if the client is on an external subnet, then routing scheme determiner 315 may determine that packets from the client are to be routed through the virtual firewall. However, if the client is on the internal subnet, then routing scheme determiner 315 may determine that packets from the client are not to be routed through the virtual firewall.

Another example routing rule specifies when to route data packets through a virtual WAN optimizer. WAN optimization is a collection of techniques for increasing data transfer efficiencies across a wide area network. A virtual WAN optimizer may perform deduplication, compression, latency optimization, caching, forward error correction, protocol spoofing and other techniques. WAN optimization mitigates complications caused by high latency and/or low bandwidth connections.

Condition monitor 320 may determine an available bandwidth for a client, a latency for packets sent to and/or received from the client, a round trip time associated with the client (an amount of time that it takes to send a message to the client and to receive an acknowledgment that the message was received), and/or other network properties associated with the client. Routing scheme determiner 315 may determine whether to route messages from and to the client through a virtual WAN optimizer based on the determined network properties. For example, if the client has a low bandwidth and high latency connection, then routing scheme determiner 315 may determine that packets to and from the client through the virtual WAN optimizer.

Another example of a routing rule is a rule that specifies that data packets meeting specific criteria should be routed through a virtual backup appliance. Thus, important data packets may be preserved in the case of a failure. Another example routing rule specifies when to redirect traffic through a virtual load balancer virtual appliance. When traffic is low, data packets may not be routed through the load balancer virtual appliance, and the load balancer may be powered down.

Routing data structure generator 330 generates a routing data structure 345 that defines a determined routing scheme. The routing data structure 345 may identify one or a sequence of virtual appliances that data packets are to be routed through. The routing data structure 345 may be a routing graph that includes multiple different routing schemes. Each path in the routing graph may represent a different routing scheme, and may itself also be considered a routing data structure. A routing data structure may also be a routing chain that represents a single routing scheme.

Additionally, a routing data structure may be a routing table. The routing table may include routing information for a single routing scheme or for multiple routing schemes. For example, each column in the routing table may represent a different virtual appliance and each row in the routing table may represent a different routing scheme. If a cell in the routing table corresponding to a particular routing scheme and a particular virtual appliance is populated, then this may indicate that data packets are to be routed through that virtual appliance for that routing scheme. A cell may be populated with a node ID that indicates an order in which to route data packets through that virtual appliance. For example, if a cell is populated with a node ID of 1, then a data packet may be routed to the virtual appliance associated with that cell before being routed to any other virtual appliances.

In one embodiment, routing data structure generator 330 assigns a routing identifier (ID) to a generated routing data structure. The routing ID can be used to identify a routing path or scheme associated with the routing data structure. Alternatively, if the routing data structure includes multiple routing paths or schemes, then routing data structure generator 300 may assign a different routing ID to each routing path in the routing data structure. Accordingly, a routing data structure may include multiple different routing IDs.

Each node in a routing data structure 345 may have a separate node ID. Additionally, routing data structure generator 330 may assign each node within a particular routing data structure 345 (or a particular path of a routing data structure that includes multiple routing schemes) a separate appliance identifier (ID). The appliance ID may indicate the virtual appliance associated with that node. For example, if a routing scheme will send data packets first to a virtual firewall and then to a virtual WAN optimizer, then the first node for the virtual firewall may have a first appliance ID and the second node for the virtual WAN optimizer may have a second appliance ID. A combination of a node ID and a routing ID may be used to determine the appliance ID of a next virtual appliance that a data packet should be routed to.

Some client devices may be mobile devices that move during a connection to the virtual server. As the mobile devices move, their IP addresses may change, their network connection quality may change, and so forth. By applying routing rules such as those mentioned above, virtual appliance router 200 may automatically change a routing scheme applied to a connection between the mobile device and the virtual server without interrupting the connection or causing any changes to the virtual sever or the mobile device. Additionally, two different mobile devices may be connected to the same virtual server, but different routing schemes may be applied to messages from the different mobile devices.

FIGS. 4A-4D illustrate various routing schemes represented by routing data structures, in accordance with embodiments of the present invention. FIG. 4A is an example routing graph 400 illustrating multiple different routing schemes, in accordance with one embodiment of the present invention. The routing graph 400 is a directed acyclic graph having multiple nodes 405-425, where each node represents an entity that will generate, receive and/or operate on a data packet. Routing graph 400 shows a source node of a client 405, which may generate a data packet. The data packet may then be routed through a virtual load balancer 410 or a virtual firewall 408. After being routed though the virtual firewall 408, the data packet may be routed through the virtual load balancer 410 or a virtual WAN optimizer 414. After being routed through the virtual load balancer 410, the data packet may be routed through the virtual WAN optimizer and/or a virtual intrusion detector 420. After being routed through the virtual WAN optimizer 414, the data packet may be routed through the virtual intrusion detector 420. After a final virtual appliance has operated on the data packet, the data packet will be sent to a virtual machine 425 that hosts a virtual server or a virtual desktop to which the data packet is addressed.

FIG. 4B illustrates an example routing scheme 401 that is associated with a particular path through the routing graph 400. The routing scheme 401 may also be defined by a routing chain. In accordance with routing scheme 401, a client 405 generates a data packet. A virtual firewall 408 then operates on the data packet, followed by a virtual load balancer 410, followed by a virtual intrusion detector 420. Finally, the data packet is sent to a virtual machine 425 of a virtual server or virtual desktop to which the data packet is addressed. As shown, routing scheme 401 has a routing ID of 1. For routing scheme 401, the client 405 has a node ID of 0, the virtual firewall 408 has a node ID of 1, the virtual load balancer 410 has a node ID of 2, the virtual intrusion detector 420 has a node ID of 3 and the virtual machine 425 has a node ID of 4.

FIG. 4C illustrates another example routing scheme 402 that is associated with another path through the routing graph 400. The routing scheme 402 may also be defined by a routing chain. In accordance with routing scheme 402, a client 405 generates a data packet. A virtual firewall 408 then operates on the data packet, followed by a virtual WAN optimizer 414. Finally, the data packet is sent to a virtual machine 425 of a virtual server or virtual desktop to which the data packet is addressed. As shown, routing scheme 402 has a routing ID of 2. For routing scheme 402, the client 405 has a node ID of 0, the virtual firewall 408 has a node ID of 1, the WAN optimizer 414 has a node ID of 2, and the virtual machine 425 has a node ID of 3.

FIG. 4D illustrates still another example routing scheme 403 that is associated with another path through the routing graph 400. The routing scheme 403 may also be defined by a routing chain. In accordance with routing scheme 403, a client 405 generates a data packet. A virtual load balancer 410 then operates on the data packet, followed by a virtual WAN optimizer 414, followed by a virtual intrusion detector 420. Finally, the data packet is sent to a virtual machine 425 of a virtual server or virtual desktop to which the data packet is addressed. As shown, routing scheme 403 has a routing ID of 3. For routing scheme 403, the client 405 has a node ID of 0, the virtual load balancer 410 has a node ID of 1, the virtual WAN optimizer 414 has a node ID of 2, the virtual intrusion detector 420 has a node ID of 3 and the virtual machine 425 has a node ID of 4.

Figure 5:
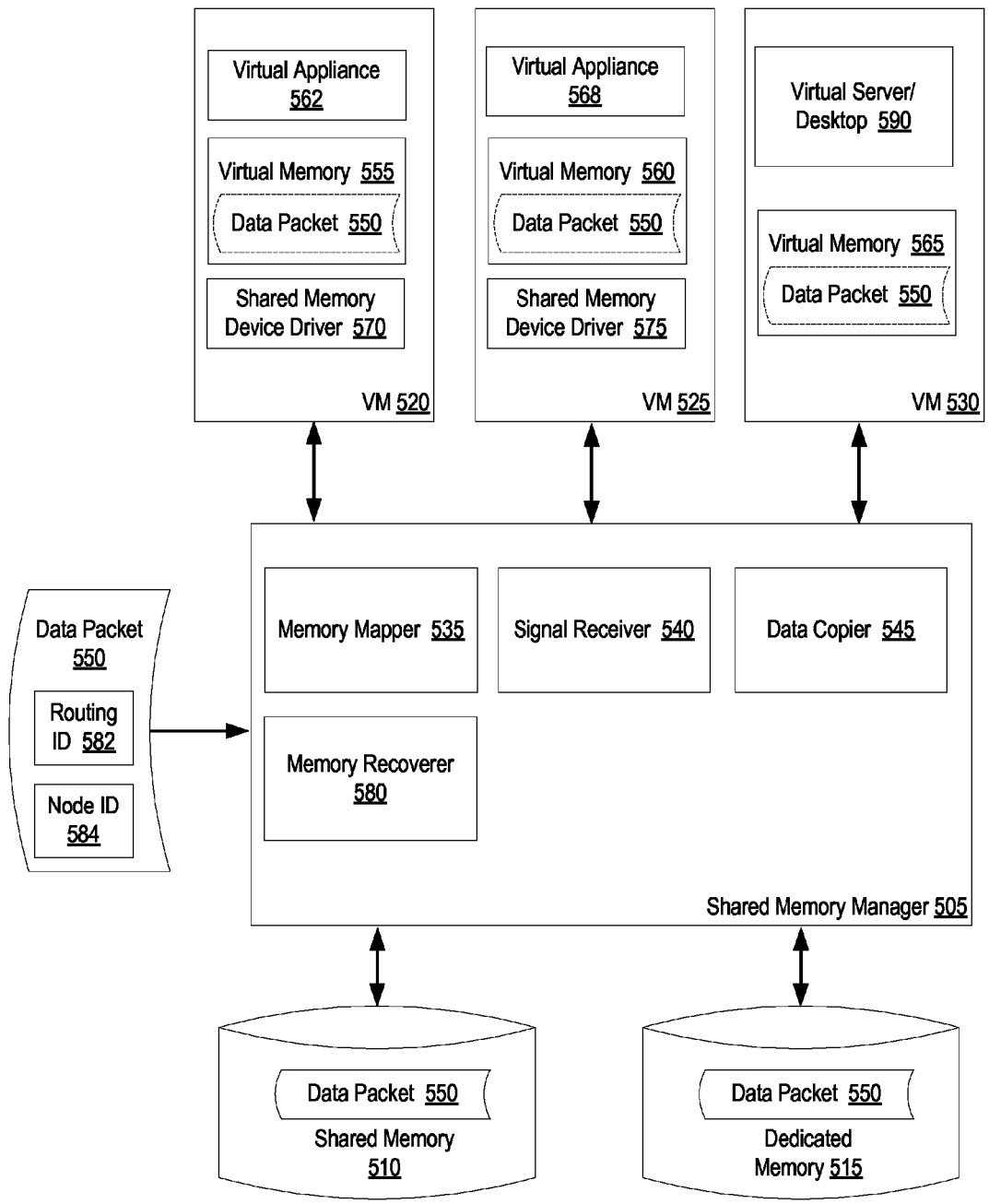
FIG. 5 is a block diagram of a shared memory manager, in accordance with one embodiment of present invention.

FIG. 5 is a block diagram of a shared memory manager 505, in accordance with one embodiment of present invention. In one embodiment, shared memory manager 505 corresponds to shared memory manager 220 of FIG. 2. Shared memory manager 505 may include a memory mapper 535, a signal receiver 540, a data copier 545 and a memory recoverer 580. The functionality of these modules may be combined into a single module or divided into multiple modules.

Shared memory manager 505 may receive an incoming data packet 550. Shared memory manager 505 may write the received data packet 550 to a buffer in a shared memory 510. The shared memory 510 is a region of memory that may be mapped to virtual memories of multiple different virtual machines (e.g., VMs 520, 525, 530). Each such VM may be unaware that the memory is a shared memory, and may regard the memory as being exclusively assigned to the virtual machine.

The received data packet 550 may have been modified by a data packet updater and/or routing scheme assigner. The modified data packet 550 may include a routing ID 582, a node ID 584 and/or an appliance ID (not shown) that were added to the data packet 550 by the data packet updater and/or the routing scheme assigner. Memory mapper 535 may identify a routing data structure that includes a routing ID included in the data packet 550, and may identify a routing scheme or path associated with the routing ID in the routing data structure. Memory mapper 535 may additionally identify a node in the identified routing scheme associated with the node ID 584 included in the data packet 550. The identified node may be associated with an appliance ID of a particular virtual appliance.

Once memory mapper 535 identifies a virtual appliance that the data packet should be routed to, memory mapper 535 determines a memory (e.g., a virtual memory 555) of the virtual appliance. Memory mapper 535 can then map the buffer of the shared memory containing the data packet to the memory of the virtual appliance.

In the illustrated example, shared memory manager 505 is communicatively coupled to virtual machine 520, virtual machine 525 and virtual machine 530. Virtual machine 520 includes virtual appliance 562 and virtual memory 555. Virtual appliance 562 includes a shared memory device driver 570. When memory mapper 535 maps the buffer of the shared memory containing the data packet 550 to virtual memory 555 of virtual machine 520, the data packet 550 becomes available for processing by the virtual appliance 562. Memory mapper 535 may send a signal (e.g., an interrupt) to the virtual appliance 562 notifying it that the data packet 550 is ready to be processed. In one embodiment, memory mapper 535 sends a signal to shared memory device driver 570 in the virtual machine 520 of the virtual appliance 562.

Once the virtual appliance 562 finishes operating on the data packet 550, it may send a response message to the shared memory device driver 570, which may also be formatted as a TCP/IP message or a UDP message. Accordingly, shared memory device driver 570 may be a component of the virtual appliance 562 that appears to the virtual appliance 562 as a standard layer 2 network interface (e.g., such as an Ethernet, infiniband or serial-IP interface). However, the shared memory device driver 570 may not generate TCP/IP or UDP packets. Instead, shared memory device driver 570 may generate a signal (e.g., an interrupt) notifying shared memory manager 505 that virtual appliance 562 is done working on the data packet 550.

In one embodiment, prior to sending the signal to shared memory manager 505, shared memory device driver 570 updates a node ID included in the data packet. For example, shared memory device driver 570 may increment the node ID by 1. Alternatively, a data packet updater included in a virtual appliance router (of which shared memory manager 505 may be a component) may update the node ID. In either case, the data packet updater may perform a table lookup to determine an appliance ID associated with the routing ID and node ID, and may add the appliance ID to the data packet and/or direct shared memory manager 505 of a next virtual appliance 568 to route the data packet 550 to.

Signal receiver 540 receives the signal from the shared memory device driver 570 indicating that the virtual appliance has completed operating on the data packet 550. Subsequently, memory mapper 535 may map the buffer that contains the data packet to a memory of a next virtual appliance. For example, virtual machine 525 includes a virtual memory 560 and a virtual appliance 568. Memory mapper 535 may map the buffer with the data packet to the virtual memory 560 associated with the virtual appliance 568. Signal receiver 540 may again receive a signal from shared memory device driver 570 when virtual appliance 568 is done operating on the data packet.

If all virtual appliances in a routing scheme have operated on a data packet, then the data packet may be ready for sending to a virtual server 590 or virtual desktop that the data packet was originally addressed to. Note that a virtual appliance may choose to drop a data packet, in which case the data packet would not be sent to any further virtual appliances or to a virtual server (or virtual desktop). If all virtual appliances in the routing scheme have operated on the data packet, then the data packet is sent to the ultimate virtual machine 530 that it was initially directed to using a virtual machine standard network interface as if it had come directly from the client. This makes it transparent to the virtual machine 530. Additionally, the virtual machine 530 may not utilize any special driver to enable receipt of the data packet.

In one embodiment, data copier 545 copies the data packet 550 from the shared memory 510 to a dedicated memory 515 that is assigned to a virtual machine 530 that includes the virtual server or virtual desktop 590. This makes the data packet available in a virtual memory 565 of the virtual machine 530 for use by the virtual server or virtual desktop 590. Once the data packet 550 has been copied to the dedicated memory 515, memory recoverer 580 may free the buffer so that a new data packet can be written to that buffer in the shared memory 510.

Figure 6:
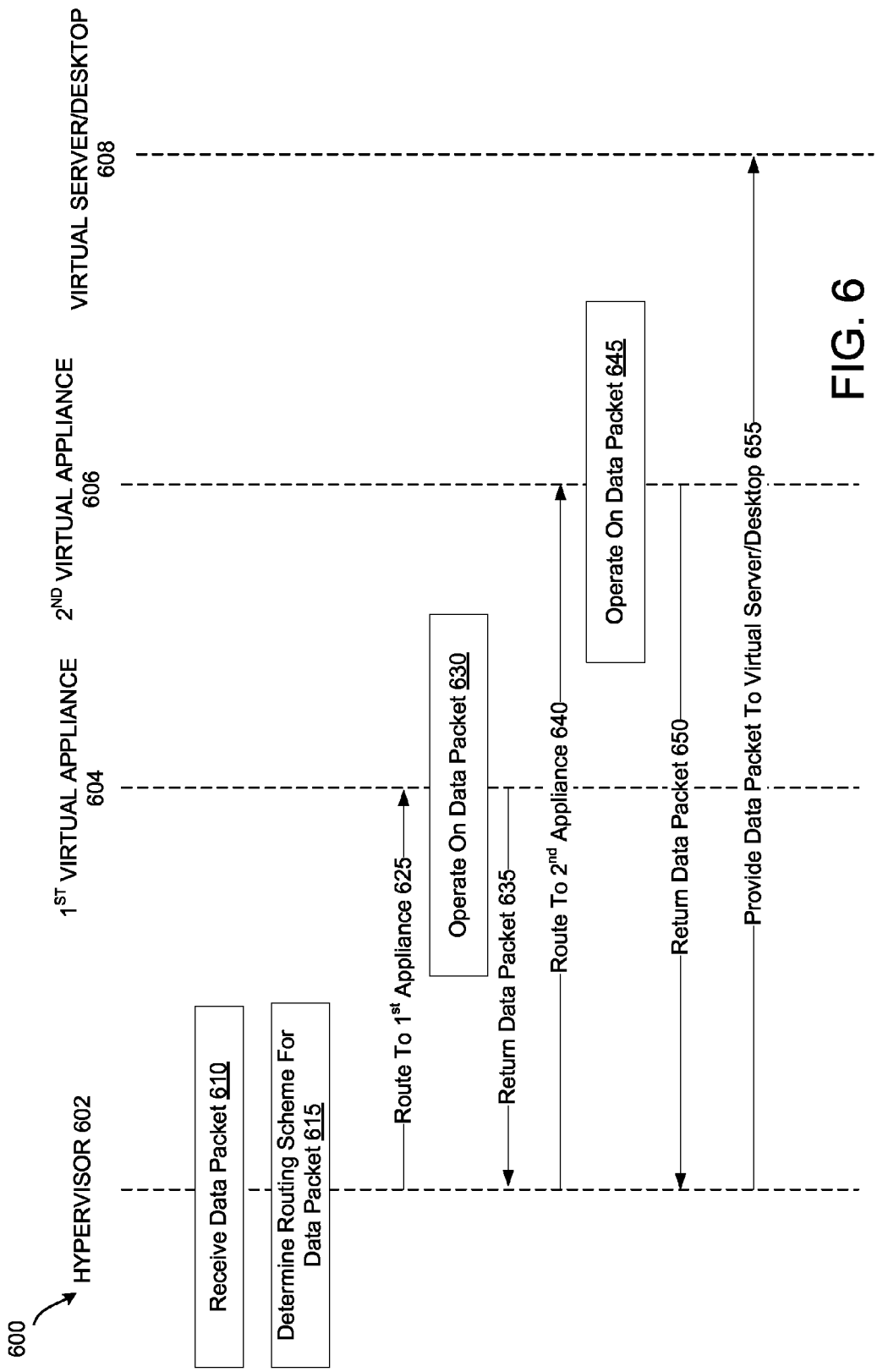
FIG. 6 is a sequence diagram illustrating one embodiment for routing data packets through a sequence of virtual appliances.

FIG. 6 is a sequence diagram illustrating one embodiment for routing data packets through a sequence of virtual appliances in accordance with a routing scheme. The sequence diagram 600 includes a hypervisor 602, a first virtual appliance 604, a second virtual appliance 606 and a virtual server (or virtual desktop) 608. In one embodiment, the hypervisor 602 manages virtual machines that run the first virtual appliance 604, second virtual appliance 606 and virtual server 608. Each of these components may run on a single host machine or on a cluster of host machines.

At block 610, the hypervisor 602 receives a data packet from a client. Note that the sequence described herein would also apply to a data packet received from a virtual server. However, in such an instance, the virtual server 608 would be replaced by a client in the sequence diagram 600.

At block 615, the hypervisor 602 determines a routing scheme for the data packet. The routing scheme may be determined based on one or more preset routing schemes associated with the virtual server 608, based on conditions associated with the client, based on network conditions, based on conditions associated with the virtual server 608 and/or based on other criteria. The hypervisor 602 may add a routing ID and a node ID to the data packet in accordance with the determined routing scheme. The routing ID and node ID together may be used to lookup in a routing data structure an appliance ID of a first virtual appliance 604 that the data packet should be sent to.

Subsequently, the hypervisor 602 routes 625 the data packet to the first virtual appliance 604 in accordance with the routing scheme. This may be performed by mapping a buffer containing the data packet to a memory of the first virtual appliance 604, by copying the data packet to a memory of the first virtual appliance 604, by transmitting a message to the first virtual appliance 604, or via another data transport mechanism. In one embodiment, the hypervisor maps the buffer to a memory of the first virtual appliance and signals a shared memory driver of the first virtual appliance indicating that the data packet is ready to be operated on. This mapping may be performed using a zero-copy technique.

At block 630, the first virtual appliance 604 operates on the data packet. Once the first virtual appliance 604 has operated on the data packet, the first virtual appliance 604 returns 635 the data packet to the hypervisor 602. In one embodiment, the first virtual appliance 604 includes a driver that signals the hypervisor that the first virtual appliance 604 has completed operations on the data packet. The driver may perform a zero copy operation to provide the data packet back to the hypervisor 602. Before signaling the hypervisor 602, the driver may update a node ID associated with the data packet. A combination of the routing ID and the updated node ID may be used to determine that the data packet should next be routed to the second virtual appliance 606.

In response to receiving the signal from the first virtual appliance 604, the hypervisor 602 may unmap the buffer containing the data packet from the memory of the first virtual appliance. Subsequently, the hypervisor 602 routes 650 the data packet to the second virtual appliance 606 in accordance with the routing scheme. This may be performed, for example, by mapping the buffer containing the data packet to a memory of the second virtual appliance 606.

At block 645, the second virtual appliance 606 operates on the data packet. Once the second virtual appliance 606 has operated on the data packet, the second virtual appliance 606 returns 650 the data packet to the hypervisor 602. Before signaling the hypervisor 602, the driver may update the node ID associated with the data packet. A combination of the routing ID and the updated node ID may be used to determine that the data packet should next be routed to the virtual server 608. The hypervisor 602 then provides 655 the data packet to the virtual server 608. This may include copying the data packet to a memory of the virtual server 608.

FIGS. 7-12 are flow diagrams of various embodiments of methods related to routing data through virtual appliances. The methods are performed by processing logic that may include hardware (circuitry, dedicated logic, etc.), software (such as is run on a general purpose computer system or a dedicated machine), or a combination of both. In one implementation, the methods may be performed by a host machine, such as host machine 100 of FIG. 1. The methods may be performed, for example, by a virtual appliance router 162, which may be a component of a hypervisor running on host machine 100.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Figure 7:
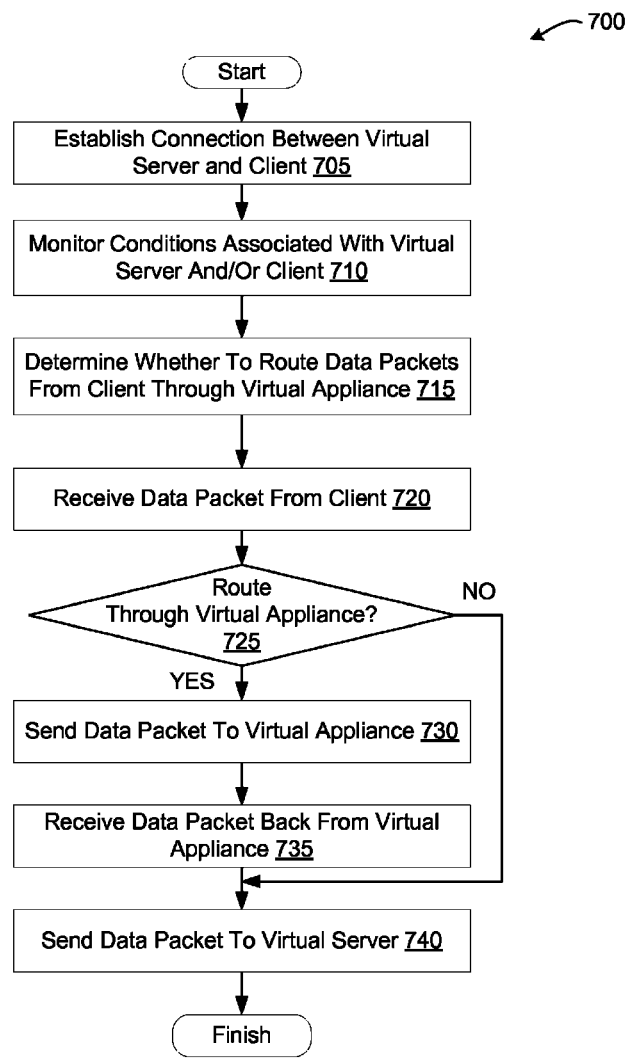
FIG. 7 is a flow diagram illustrating one embodiment for a method of determining whether to route a data packet to a virtual appliance.

FIG. 7 is a flow diagram illustrating one embodiment for a method 700 of determining whether to route a data packet to a virtual appliance. At block 705 of method 700, processing logic establishes a connection between a virtual server and a client. At block 710, processing logic monitors conditions associated with the virtual server and/or the client. For example, processing logic may monitor a location of the client as determined based on a closest cell tower of the client (if the client is connected to a wireless carrier) or a global positioning system (GPS) (if the client includes a GPS receiver). Processing logic may also monitor an IP address associated with the client, network conditions for the client, and so forth. Processing logic may also monitor a load on the virtual server, bandwidth available to the virtual server, etc.

At block 715, processing logic determines whether to route data packets from the client through a virtual appliance based on the monitored conditions. For example, if the client is on a different subnet than the virtual server, then processing logic may decide to route data packets from the client through a firewall. In another example, if the client has a low bandwidth and/or high latency connection to the virtual server, then processing logic may determine to route data packets from the client through a virtual WAN optimizer. Processing logic may determine, for example, whether to bypass routing data packets through a virtual appliance identified in a routing scheme.

At block 720, processing logic receives a data packet from the client. At block 725, processing logic chooses either to route the data packet though a particular virtual appliance or not to route the data packet through the particular virtual appliance based on the determination that was made at block 715. If processing logic determines to route the data packet through the particular virtual appliance, the method continues to block 730. Otherwise, the method continues to block 740.

At block 730, processing logic sends the data packet to the virtual appliance. At block 735, processing logic then receives the data packet back from the virtual appliance after the virtual appliance has operated on the data packet. At block 740, processing logic sends the data packet to the virtual server.

Note that method 700 may also apply to messages directed to a virtual desktop by a client. Additionally method 700 may apply to messages received from a virtual server or virtual desktop that are addressed to a client. For example, processing logic may receive a data packet from a virtual server, route the data packet through a virtual appliance, and then send the data packet to the client.

Figure 8:
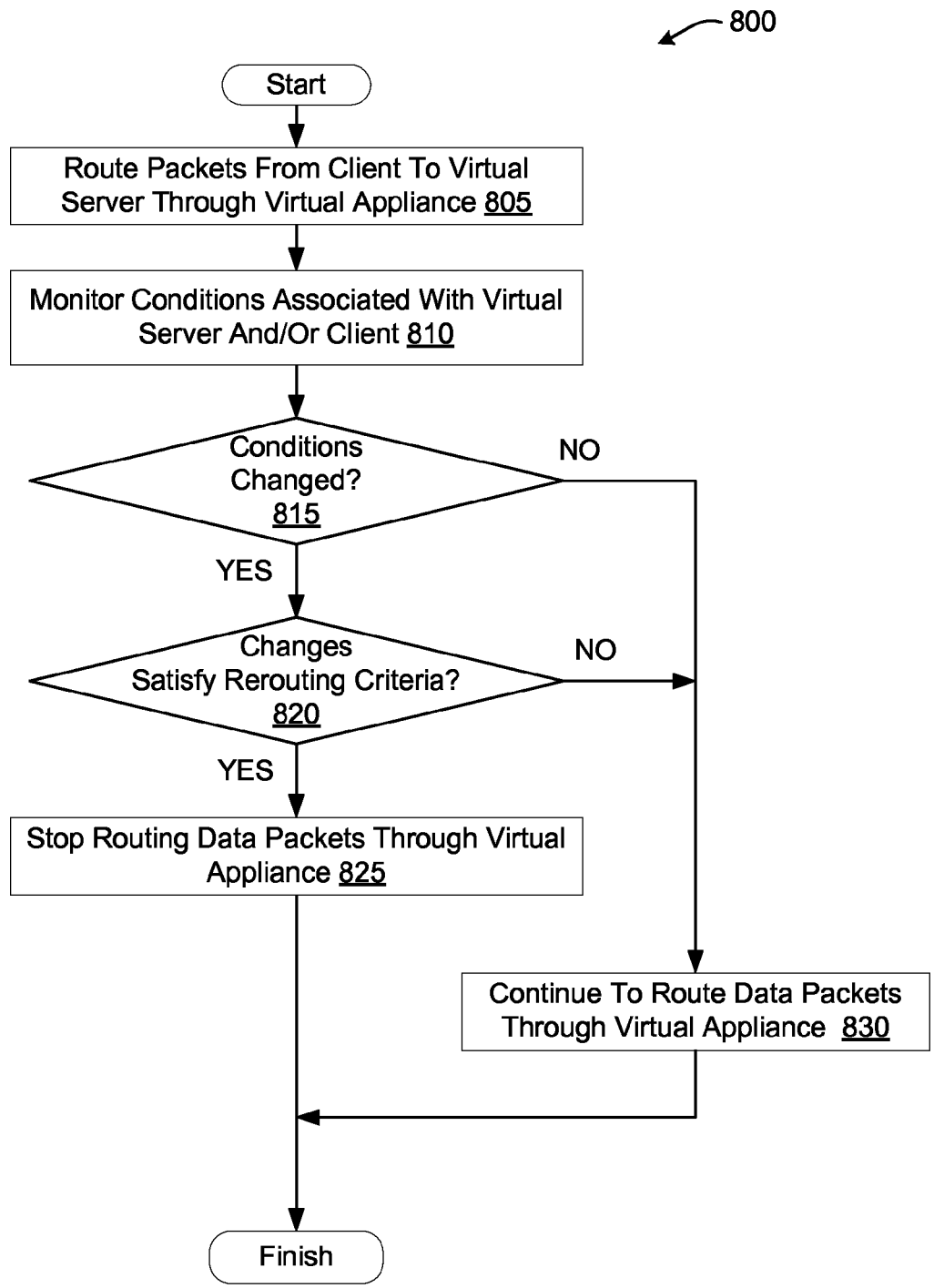
FIG. 8 is a flow diagram illustrating another embodiment for a method of determining whether to route data packets to a virtual appliance.

FIG. 8 is a flow diagram illustrating another embodiment for a method 800 of determining whether to route data packets to a virtual appliance. At block 805 of method 800, processing logic routes data packets from a client to a virtual server through a virtual appliance. At block 810, processing logic monitors conditions associated with the virtual server and/or the client. At block 815, processing logic determines whether any monitored conditions have changed since the processing logic last made a decision as to whether to route data packets between the client and virtual server through a virtual appliance. If conditions have changed, the method continues to block 820. If conditions have not changed, the method proceeds to block 830.

At block 820, processing logic determines whether any of the identified changes in the monitored conditions satisfy rerouting criteria. For example, if a client device is a mobile device that originally connected to the virtual server from a Wi-Fi network in a café, then a previous decision to route data packets from the client through a virtual firewall may have been made. However, if the client goes into work and enters a subnet that is shared by the virtual server, then the change in the subnet may satisfy a rerouting criterion that specifies that processing logic should stop routing data packets from the client through a virtual firewall. Alternatively, if the client starts a connection to the virtual server while on the same subnet but moves outside of the subnet, this may also satisfy a rerouting criterion that specifies that processing logic should begin routing data packets from the client though a virtual firewall. In another example, if the client device initially has a low bandwidth connection to the virtual server, but the connection improves and becomes a high bandwidth connection, then this may satisfy a rerouting criterion that causes processing logic to stop routing data packets from the client through a virtual WAN optimizer. Similarly, if the client device initially has a high bandwidth connection that degrades, this may satisfy a rerouting criterion that specifies that processing logic should begin routing data packets from the client through a virtual WAN optimizer.

If at block 820 a rerouting criterion has been satisfied, the method continues to block 825. Otherwise, the method proceeds to block 830. At block 825, processing logic stops routing data packets from the client through the virtual appliance. At block 830, on the other hand, processing logic continues to route data packets from the client through the virtual appliance.

Figure 9:
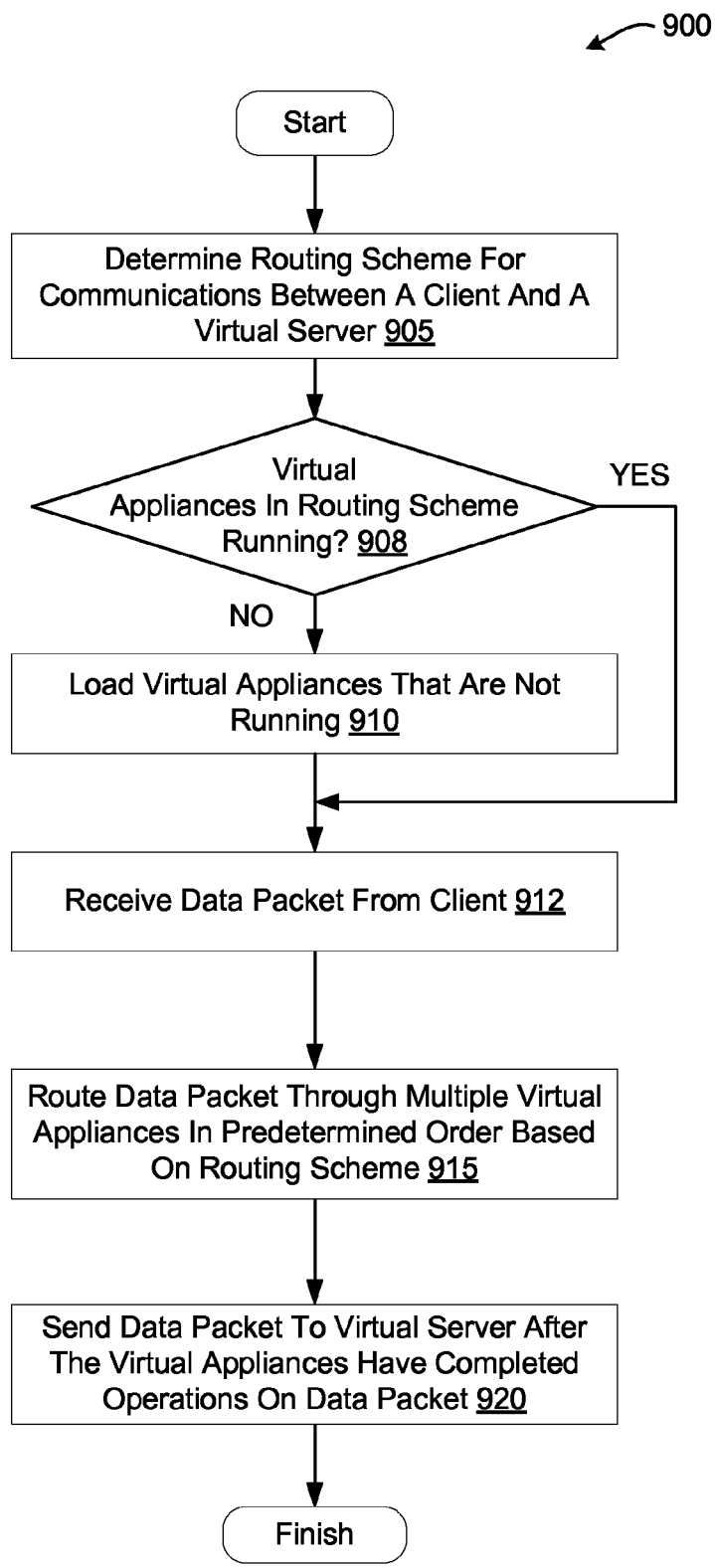
FIG. 9 is a flow diagram illustrating one embodiment for a method of determining a routing scheme for communications between a client and a virtual machine.

FIG. 9 is a flow diagram illustrating one embodiment for a method 900 of managing a routing scheme for communications between a client and a virtual server. At block 905 of method 900, processing logic determines a routing scheme for communications between a client and the virtual server. The routing scheme may be determined based on a routing policy, one or more routing rules, one or more monitored conditions and/or other information. At block 908, processing logic determines whether the virtual appliances indicated in the routing scheme are running. If any such virtual appliances are not running, at block 910 processing logic loads those virtual appliances that are not running. If all of the virtual appliances in the routing scheme are running, processing logic continues to block 912.

At block 912, processing logic receives a data packet from the client. At block 915, processing logic routes the data packet through multiple virtual appliances in a predetermined order based on the routing scheme. At block 920, processing logic sends the data packet to the virtual server after the virtual appliances have completed operations on the data packet. The method then ends.

Figure 10:
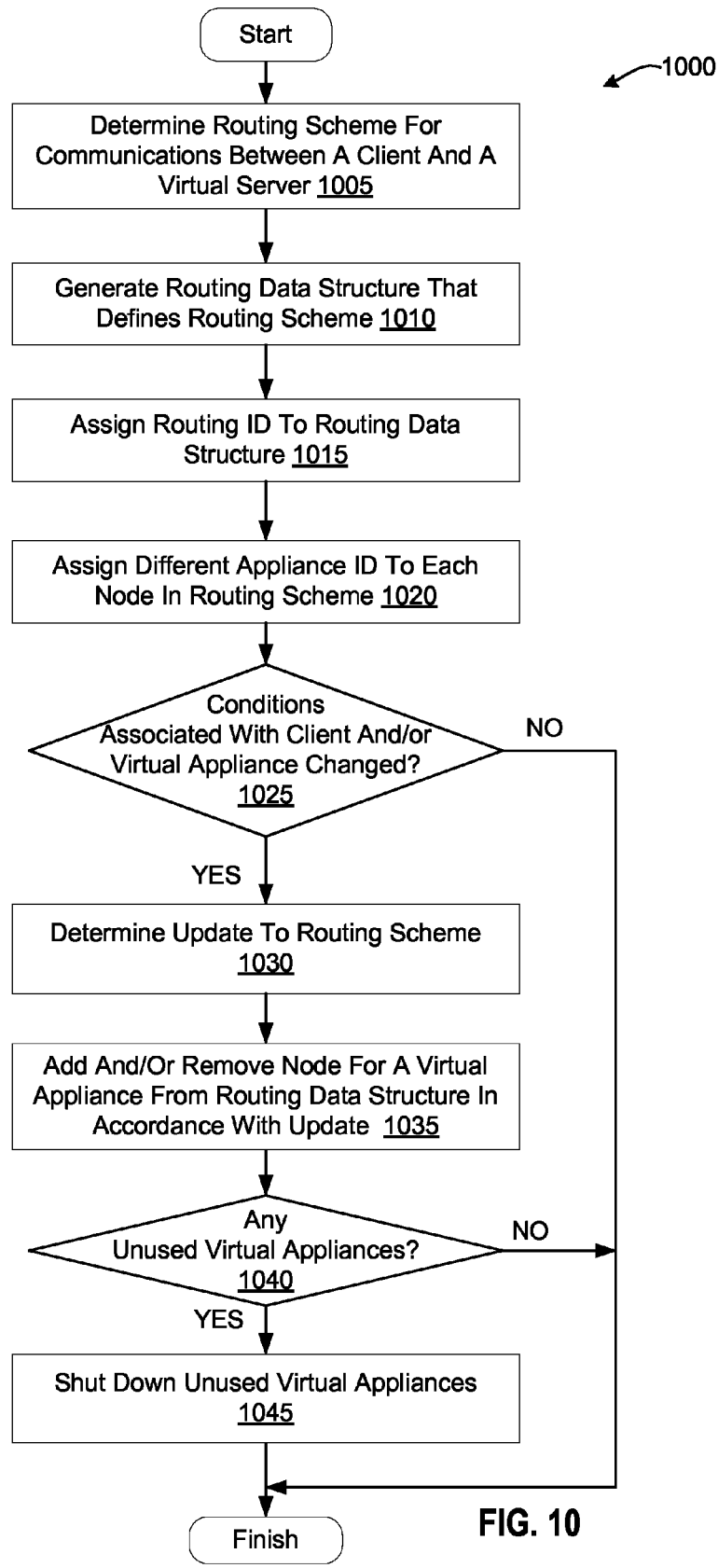
FIG. 10 is a flow diagram illustrating one embodiment for a method of updating a routing scheme in accordance with changing conditions.

FIG. 10 is a flow diagram illustrating one embodiment for a method 1000 of updating a routing scheme in accordance with changing conditions. At block 1005 of method 1000, processing logic determines a routing scheme for communications between a client and a virtual server (or virtual desktop). At block 1010, processing logic generates a routing data structure that defines the routing scheme. The routing data structure may be a routing chain or a routing path that is a subset of a larger routing data structure. At block 1015, processing logic assigns a routing ID to the routing data structure. Each virtual appliance may have its own unique appliance ID. At block 1020, processing logic assigns a different appliance ID to each node in the routing data structure. This may identify, for each node in the routing scheme, which virtual appliance should operate on a data packet. For example, an appliance ID for a virtual firewall may be assigned to a first node (e.g., having a node ID of 1) in the virtual data structure.

At block 1025, processing logic determines whether conditions associated with the client and/or the virtual server have changed since the routing scheme was determined (and the routing data structure was generated). If the conditions have changed enough to warrant a change in the routing scheme, the method continues to block 1030. Otherwise, the method ends.

At block 1030, processing logic determines an update to the routing scheme. At block 1035, processing logic adds or removes a node for a virtual appliance from the routing data structure in accordance with the update. At block 1040, processing logic then determines whether there are any unused virtual appliances. If there are unused virtual appliances, then at block 1045 processing logic shuts down the unused virtual appliances. Since virtual appliances consume resources such as processor resources, memory resources, and so forth, this may conserve system resources. Otherwise, the method ends.

Figure 11:
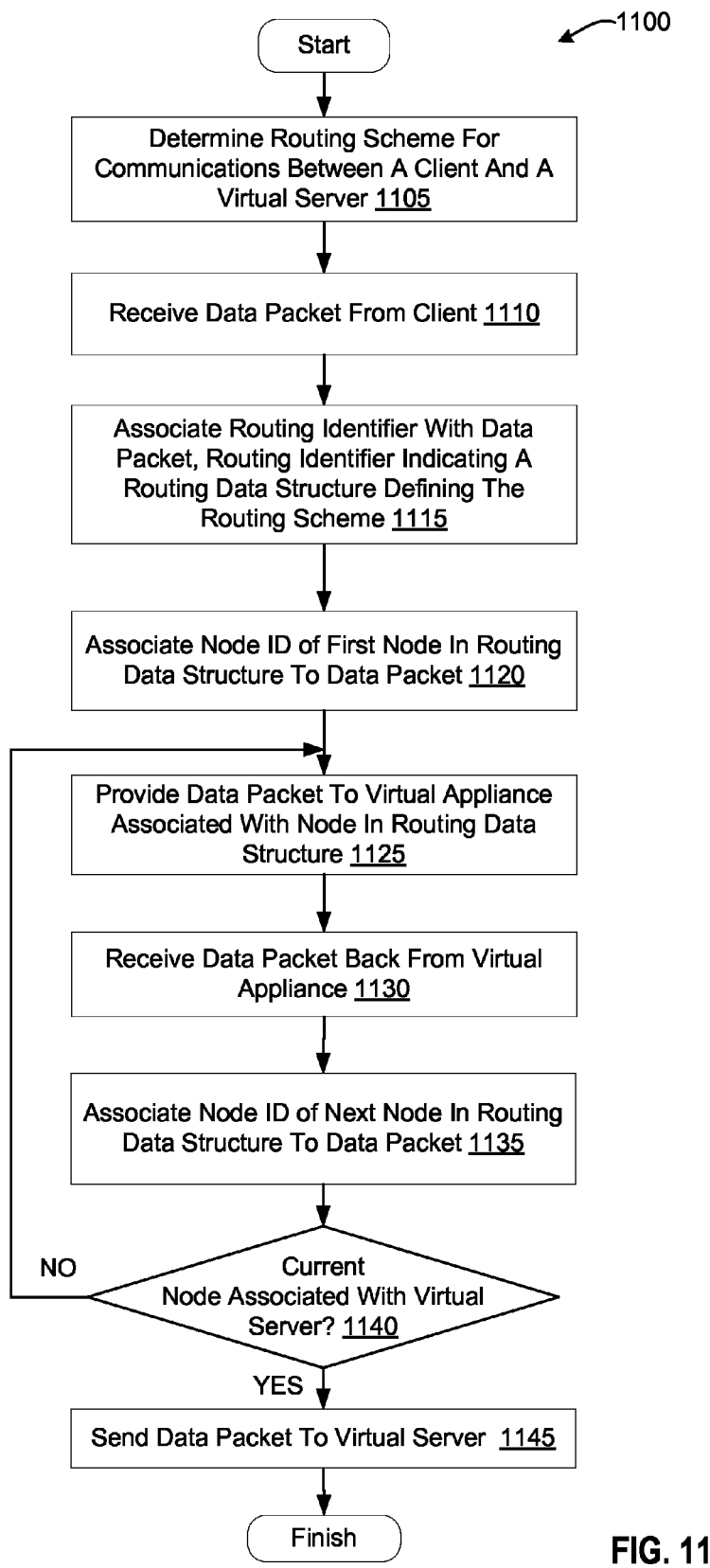
FIG. 11 is a flow diagram illustrating one embodiment for a method of routing a data packet through a sequence of virtual appliances in accordance with a routing scheme.

FIG. 11 is a flow diagram illustrating one embodiment for a method 1100 of routing a data packet through a sequence of virtual appliances in accordance with a routing scheme. At block 1105 of method 1100, processing logic determines a routing scheme for communications between a client and a virtual server. At block 1110, processing logic receives a data packet from the client. At block 1115, processing logic associates a routing identifier with the data packet. The routing identifier may indicate a routing data structure that defines the routing scheme.

At block 1120, processing logic associates a node ID of a first node in the routing data structure to the data packet. Processing logic may determine, for example, a particular routing chain to use for a data packet based on the routing ID. The routing chain may include 3 nodes, including a first node having a node ID of 1 and being associated with a virtual firewall having an appliance ID of 11, second node having a node ID of 2 and being associated with a virtual WAN optimizer with an appliance ID of 18 and a third node having a node ID of 3 and being associated with a virtual virus detector having an appliance ID of 92. If the node ID associated with the data packet is 1, then processing logic may determine from the virtual data structure that the data packet should be routed to the virtual firewall.

At block 1125, processing logic provides the data packet to the virtual appliance associated with the current node ID, which is in turn associated with the data packet. At block 1130, processing logic receives the data packet back from the virtual appliance. At block 1135, processing logic associates a node ID of a next node in the routing data structure to the data packet. For example, in the example above, the node ID of 2 would be assigned to the data packet. At block 1140, processing logic determines whether the current node is associated with the virtual server. If not, the method returns to block 1125. Otherwise, the method continues to block 1145, and processing logic sends the data packet to the virtual server.

Figure 12:
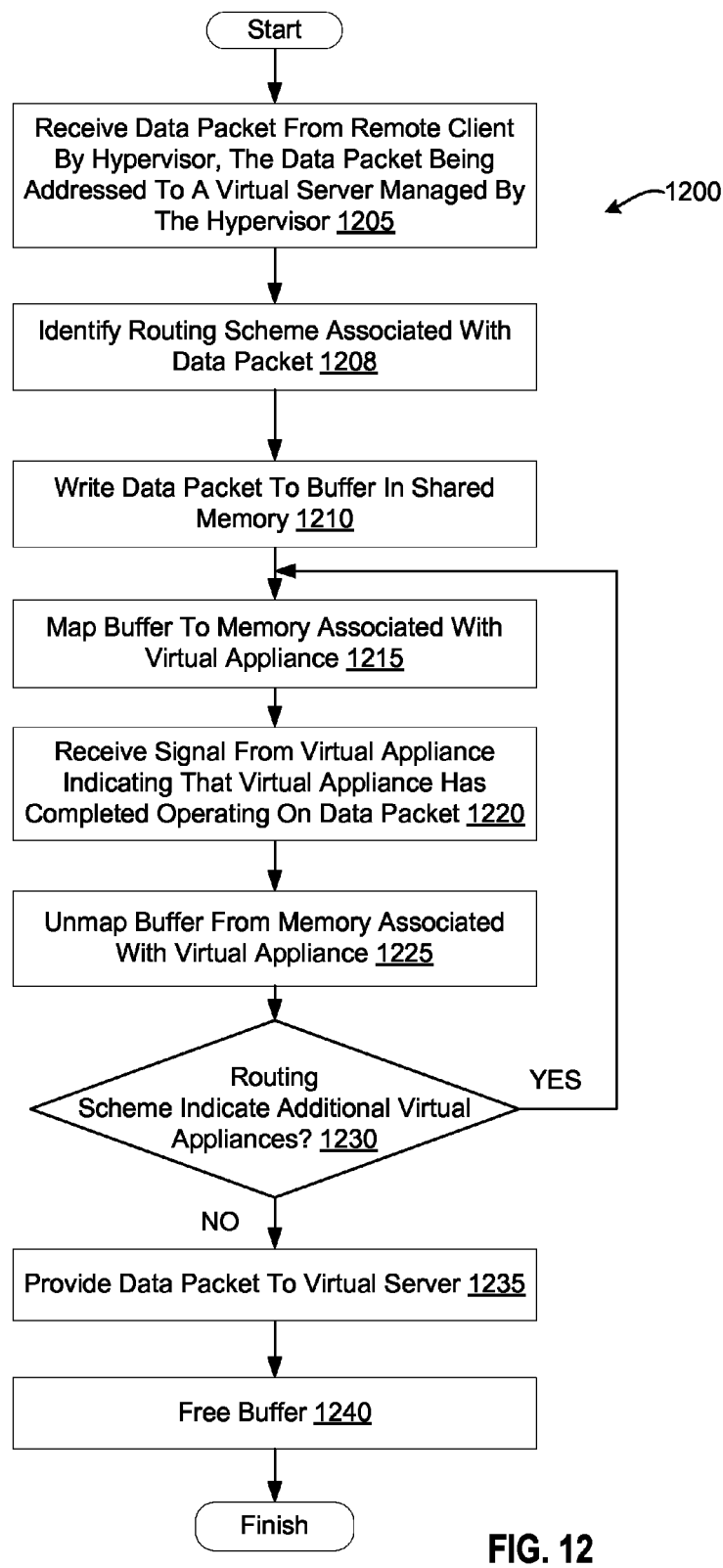
FIG. 12 is a flow diagram illustrating one embodiment for a method of using a shared memory to route data packets to virtual appliances.

FIG. 12 is a flow diagram illustrating one embodiment for a method 1200 of using a shared memory to route data packets to virtual appliances. At block 1205 of method 1200, a hypervisor receives a data packet from a remote client. The data packet may be addressed to a virtual server managed by the hypervisor. At block 1208, the hypervisor identifies a routing scheme associated with the data packet.

At block 1210, the hypervisor writes the data packet to a buffer in a shared memory that is also managed by the hypervisor. At block 1215, processing logic maps the buffer in the shared memory to a memory associated with a virtual appliance indicated in the routing scheme. The memory associated with the virtual appliance may be a virtual memory space. Processing logic may additionally send a signal to the virtual appliance indicating that the data packet is available to be operated on.

At block 1220, the hypervisor receives a signal from the virtual appliance indicating that the virtual appliance has completed operating on the data packet. At block 1225, the hypervisor unmaps the buffer from the memory associated with the virtual appliance.

At block 1230, the hypervisor determines whether the routing scheme indicates any additional virtual appliances to route data packets through. If so, the method returns to block 1215. Otherwise, the method continues to block 1235.

At block 1235, the hypervisor provides the data packet to the virtual server. This may include copying the data packet to a buffer in a memory of the virtual server. At block 1240, the hypervisor frees the memory buffer in the shared memory. Note that in an alternative embodiment, the hypervisor may map the buffer to a memory of the virtual server rather than copying the data packet. In such an instance, the hypervisor would wait to receive a signal from the virtual machine indicating that the virtual machine will no longer use the data packet before freeing the buffer.

Note that multiple operations have been described as being performed by a hypervisor. If should be understood that in alternative embodiments a virtual appliance router may be a software module that is distinct from the hypervisor. The virtual appliance router may perform at least some of the above operations that were described as being performed by the hypervisor. Additionally, the memory mapping and unmapping may be performed in some embodiments by using memory management tools that are available in the Linux operating system (e.g., if the hypervisor runs on a host Linux OS).

Figure 13:
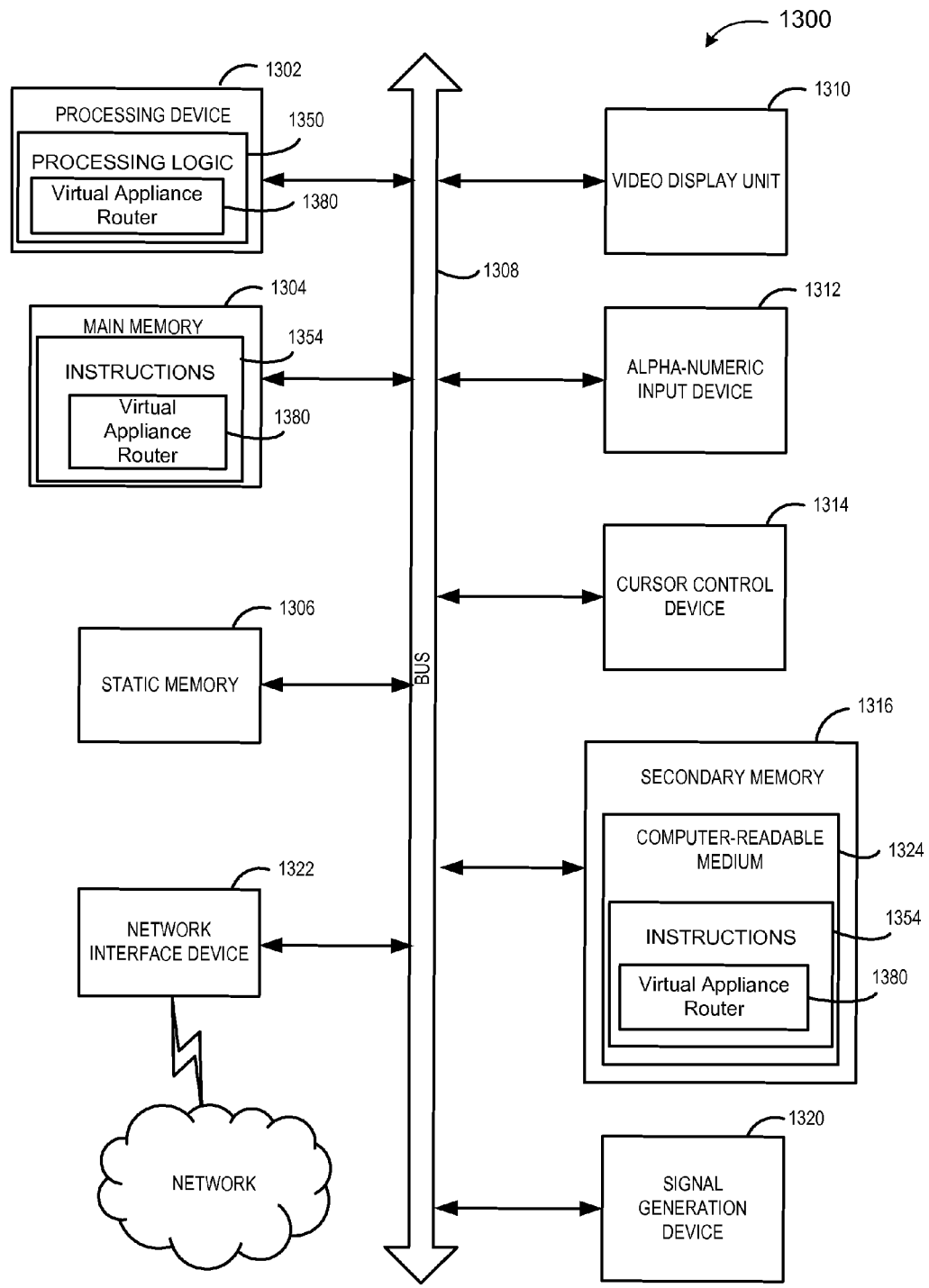
FIG. 13 illustrates a diagrammatic representation of a machine in the exemplary form of a computer system.

FIG. 13 illustrates a diagrammatic representation of a machine in the exemplary form of a computer system 1300 within which a set of instructions, for causing the machine to perform any one or more of the methodologies discussed herein, may be executed. The computer system 1300 may correspond to host machine 100 of FIG. 1. In embodiments of the present invention, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1300 includes a processing device 1302, a main memory 1304 (e.g., read-only memory (ROM), flash memory, dynamic random access memory (DRAM) such as synchronous DRAM (SDRAM) or Rambus DRAM (RDRAM), etc.), a static memory 1306 (e.g., flash memory, static random access memory (SRAM), etc.), and a secondary memory 1316 (e.g., a data storage device), which communicate with each other via a bus 1308.

The processing device 1302 represents one or more general-purpose processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core CPU, a multi-core CPU and a massively multi-core system that includes many interconnected integrated circuits, each of which may include multiple processor cores. The processing device 1302 may therefore include multiple processors. The processing device 1302 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 1302 may also be one or more special-purpose processing devices such as an application specific integrated circuit (ASIC), a field programmable gate array (FPGA), a digital signal processor (DSP), network processor, or the like.

The computer system 1300 may further include a network interface device 1322. The computer system 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse), and a signal generation device 1320 (e.g., a speaker).

The secondary memory 1316 may include a machine-readable storage medium (or more specifically a computer-readable storage medium) 1324 on which is stored one or more sets of instructions 1354 embodying any one or more of the methodologies or functions described herein (e.g., virtual appliance router 1380). The instructions 1354 may also reside, completely or at least partially, within the main memory 1304 and/or within the processing device 1302 during execution thereof by the computer system 1300; the main memory 1304 and the processing device 1302 also constituting machine-readable storage media.

While the computer-readable storage medium 1324 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine that cause the machine to perform any one or more of the methodologies of the present invention. The term "computer-readable storage medium" shall accordingly be taken to include, but not be limited to, solid-state memories, and optical and magnetic media.

The modules, components and other features described herein (for example in relation to FIG. 1) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "monitoring", "receiving", "determining", "routing", "assigning", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
  receiving a data packet by a processing device executing a virtual machine and a hypervisor that manages the virtual machine, wherein the data packet is addressed to the virtual machine;
  writing, by the processing device, the data packet to a buffer in a shared physical memory that is shared by the hypervisor and an additional virtual machine configured as a virtual appliance that is hosted by the hypervisor, wherein the hypervisor, the virtual machine and the virtual appliance are collocated on a machine that comprises the processing device;

mapping, by the processing device, the buffer to a virtual memory of the virtual appliance to enable the virtual appliance to operate on the data packet, wherein no copy of the data packet is generated to provide the data packet from the shared physical memory to the virtual appliance;

signaling, by the processing device, the hypervisor after the virtual appliance has operated on the data packet, wherein the virtual appliance comprises a driver that acts as a standard network interface; and performing, by the driver, a zero copy operation to provide the data packet to the virtual machine after the virtual appliance has operated on the data packet.

2. The method of claim 1, wherein providing the data packet to the virtual machine comprises:

copying the data packet to an additional buffer in an additional physical memory that is mapped to an additional virtual memory of the virtual machine, wherein the buffer in the shared physical memory is freed for reuse after performing the copying.

3. The method of claim 1, wherein the shared physical memory is additionally shared by an additional virtual appliance, the method further comprising:

receiving, by the processing device, a signal from the virtual appliance in response to the virtual appliance completing an operation on the data packet;

unmapping the data packet from the virtual memory of the virtual appliance;

mapping the data packet to an additional virtual memory of the additional virtual appliance after receiving the signal;

receiving an additional signal from the additional virtual appliance in response to the additional virtual appliance completing an additional operation on the data packet; and providing the data packet to the virtual machine after receiving the additional signal.

4. The method of claim 1, wherein the virtual appliance is one of a plurality of virtual appliances that are connected to the hypervisor in a star topology.

5. The method of claim 1, wherein the virtual appliance is one of a plurality of virtual appliances, wherein the processing device maps the buffer to virtual memories of the plurality of virtual appliances one virtual appliance at a time, and wherein the processing device unmaps the buffer from the virtual memories of the plurality of virtual appliances as they complete operating on the data packet.

6. The method of claim 1, wherein the virtual machine comprises one of a virtual server or a virtual desktop, and wherein the virtual appliance comprises at least one of a virtual firewall, a virtual wide area network (WAN) optimizer, a virtual load balancer, or a virtual intrusion detector.

7. A non-transitory computer readable storage medium having instructions that, when executed by a processing device, cause the processing device to:

receive a data packet by the processing device executing a virtual machine and a hypervisor that manages the virtual machine, wherein the data packet is addressed to the virtual machine;

write, by the processing device, the data packet to a buffer in a shared physical memory that is shared by the hypervisor and an additional virtual machine configured as a virtual appliance that is hosted by the hypervisor, wherein the hypervisor, the virtual machine and the virtual appliance are collocated on a machine that comprises the processing device;

map, by the processing device, the buffer to a virtual memory of the virtual appliance to enable the virtual appliance to operate on the data packet, wherein no copy of the data packet is generated to provide the data packet from the shared physical memory to the virtual appliance;

signal, by the processing device, the hypervisor after the virtual appliance has operated on the data packet, wherein the virtual appliance comprises a driver that acts as a standard network interface; and perform, by the driver, a zero copy operation to provide the data packet to the virtual machine after the virtual appliance has operated on the data packet.

8. The non-transitory computer readable storage medium of claim 7, wherein to provide the data packet to the virtual machine, the processing device is to:

copy the data packet to an additional buffer in an additional physical memory that is mapped to an additional virtual memory of the virtual machine, wherein the buffer in the shared memory is freed for reuse after performing the copying.

9. The non-transitory computer readable storage medium of claim 7, wherein the shared physical memory is additionally shared by an additional virtual appliance, and wherein the instructions further cause the processing device to:

receive a signal from the virtual appliance in response to the virtual appliance completing an operation on the data packet;

unmap the data packet from the virtual memory of the virtual appliance;

map the data packet to an additional virtual memory of the additional virtual appliance after receiving the signal;

receive an additional signal from the additional virtual appliance in response to the additional virtual appliance completing an additional operation on the data packet; and provide the data packet to the virtual machine after receiving the additional signal.

10. The non-transitory computer readable storage medium of claim 7, wherein the virtual appliance is one of a plurality of virtual appliances that are connected to the hypervisor in a star topology.

11. The non-transitory computer readable storage medium of claim 7, wherein the virtual appliance is one of a plurality of virtual appliances, wherein the hypervisor maps the buffer to virtual memories of the plurality of virtual appliances one virtual appliance at a time, and wherein the hypervisor unmaps the buffer from the virtual memories of the plurality of virtual appliances as they complete operating on the data packet.

12. The non-transitory computer readable storage medium of claim 7, wherein the virtual machine comprises one of a virtual server or a virtual desktop, and wherein the virtual appliance comprises at least one of a virtual firewall, a virtual wide area network (WAN) optimizer, a virtual load balancer, or a virtual intrusion detector.

13. A computing device comprising:

a shared physical memory that is shared by a hypervisor and a virtual machine configured as a virtual appliance; and a processing device, operatively coupled to the shared memory, wherein the processing device is to:

execute an additional virtual machine and the hypervisor that manages the additional virtual machine;

receive a data packet that is addressed to the additional virtual machine;

write the data packet to a buffer in the shared physical memory;

map the buffer to a virtual memory of the virtual appliance that is hosted by the hypervisor to enable the virtual appliance to operate on the data packet, wherein no copy of the data packet is generated to provide the data packet from the shared physical memory to the virtual appliance;

signal the hypervisor after the virtual appliance has operated on the data packet, wherein the virtual appliance comprises a driver that acts as a standard network interface; and perform, by the driver, a zero copy operation to provide the data packet to the additional virtual machine after the virtual appliance has operated on the data packet.

14. The computing device of claim 13, wherein to provide the data packet to the additional virtual machine, the processing device is to:

copy the data packet to an additional buffer in an additional physical memory that is mapped to an additional virtual memory of the additional virtual machine, wherein the buffer in the shared physical memory is freed for reuse after performing the copying.

15. The computing device of claim 13, wherein the shared physical memory is additionally shared by an additional virtual appliance, and wherein the processing device is further to:

receive a signal from the virtual appliance in response to the virtual appliance completing an operation on the data packet;

unmap the data packet from the virtual memory of the virtual appliance;

map the data packet to an additional virtual memory of the additional virtual appliance after receiving the signal;

receive an additional signal from the additional virtual appliance in response to the additional virtual appliance completing an additional operation on the data packet; and provide the data packet to the additional virtual machine after receiving the additional signal.

16. The computing device of claim 13, wherein the virtual appliance is one of a plurality of virtual appliances that are connected to the hypervisor in a star topology.

17. The computing device of claim 13, wherein the virtual appliance is one of a plurality of virtual appliances, wherein the hypervisor maps the buffer to virtual memories of the plurality of virtual appliances one virtual appliance at a time, and wherein the hypervisor unmaps the buffer from the virtual memories of the plurality of virtual appliances as they complete operating on the data packet.

* * * * *